(12) United States Patent
Bennett et al.

(10) Patent No.: US 10,804,965 B2
(45) Date of Patent: *Oct. 13, 2020

(54) CIRCUIT PANEL NETWORK AND METHODS THEREOF

(71) Applicant: AT&T INTELLECTUAL PROPERTY I, L.P., Atlanta, GA (US)

(72) Inventors: Robert Bennett, Southold, NY (US); Irwin Gerszberg, Kendall Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 112 days.

This patent is subject to a terminal disclaimer.

(21) Appl. No.: 15/587,922

(22) Filed: May 5, 2017

(65) Prior Publication Data

US 2017/0244448 A1 Aug. 24, 2017

Related U.S. Application Data

(63) Continuation of application No. 14/505,580, filed on Oct. 3, 2014, now Pat. No. 9,685,992.

(51) Int. Cl.
*H04B 3/54* (2006.01)
*H04B 5/00* (2006.01)
*H04L 12/28* (2006.01)

(52) U.S. Cl.
CPC .............. *H04B 3/54* (2013.01); *H04B 5/0031* (2013.01); *H04B 2203/5408* (2013.01);
(Continued)

(58) Field of Classification Search
CPC ............ H04B 3/54; H04B 5/0031; H04B 2203/5408; H04B 2203/5433; H04B 2203/5441; H04L 2012/2843
See application file for complete search history.

(56) References Cited

U.S. PATENT DOCUMENTS 2,685,068 A 7/1954 Goubau
2,852,753 A 9/1958 Gent et al.
(Continued)

FOREIGN PATENT DOCUMENTS

CN 103700442 A 4/2014
EP 2568528 B1 12/2017
(Continued)

OTHER PUBLICATIONS

"IEEE Standard for Information technology—Local and metropolitan area networks—Specific requirements", Part 15.4: Wireless Medium Access Control (MAC) and Physical Layer (PHY) Specifications for Low Rate Wireless Personal Area Networks (WPANs), in IEEE Std 802.15.4, (Revision of IEEE Std 802.15.4-2003), Sep. 7, 2006, 1-320.

(Continued)

*Primary Examiner* — Michelle M Koeth
(74) *Attorney, Agent, or Firm* — Guntin & Gust, PLC; Ralph Trementozzi

(57) ABSTRACT

Aspects of the subject disclosure may include, for example, receiving wirelessly a first transmission of data from a network interface device, wherein the network interface device includes a receiver and a transmitter. The network interface device receives, via the receiver, electromagnetic waves that propagate on a surface of a dielectric transmission medium. The network interface device converts, via the receiver, the electromagnetic waves to an electrical signal, and transmits, via the transmitter, a first transmission of the data based on the electrical signal. A determination is made that the data is to be directed towards a recipient device connected to at least one electrical circuit and, based on the determination, a second transmission of the data is initiated as a power line communication transmission of a utility (Continued)

power line via the at least one electrical circuit. Other embodiments are disclosed.

20 Claims, 17 Drawing Sheets

(52) U.S. Cl.
CPC .............. *H04B 2203/5433* (2013.01); *H04B 2203/5441* (2013.01); *H04L 2012/2843* (2013.01)

(56) References Cited

U.S. PATENT DOCUMENTS

| | | | |
|---|---|---|---|
| 2,921,277 A | 1/1960 | Goubau | |
| 4,783,665 A | 11/1988 | Lier et al. | |
| 4,786,911 A * | 11/1988 | Svy | H01Q 1/30 343/707 |
| 5,107,231 A | 4/1992 | Knox et al. | |
| 5,642,121 A | 6/1997 | Martek et al. | |
| 5,710,804 A * | 1/1998 | Bhame | H02B 1/50 379/437 |
| 5,889,449 A | 3/1999 | Fiedziuszko | |
| 5,937,335 A | 8/1999 | Park et al. | |
| 6,239,377 B1 | 5/2001 | Nishikawa et al. | |
| 7,009,471 B2 | 3/2006 | Elmore | |
| 7,043,271 B1 | 5/2006 | Seto et al. | |
| 7,301,424 B2 | 11/2007 | Suarez-Gartner et al. | |
| 7,567,154 B2 | 7/2009 | Elmore | |
| 7,590,404 B1 | 9/2009 | Johnson et al. | |
| 7,826,602 B1 * | 11/2010 | Hunyady | H04L 29/125 370/389 |
| 7,925,235 B2 | 4/2011 | Konya et al. | |
| 8,159,385 B2 | 4/2012 | Farneth et al. | |
| 8,212,635 B2 | 7/2012 | Miller, II et al. | |
| 8,253,516 B2 | 8/2012 | Miller, II et al. | |
| 8,269,583 B2 | 9/2012 | Miller, II et al. | |
| 8,344,829 B2 | 1/2013 | Miller, II et al. | |
| 8,897,697 B1 | 11/2014 | Bennett et al. | |
| 9,520,945 B2 | 12/2016 | Gerszberg et al. | |
| 9,525,524 B2 | 12/2016 | Barzegar et al. | |
| 9,564,947 B2 | 2/2017 | Stuckman et al. | |
| 9,608,740 B2 | 3/2017 | Henry et al. | |
| 9,627,768 B2 | 4/2017 | Henry et al. | |
| 9,640,850 B2 | 5/2017 | Henry et al. | |
| 9,653,770 B2 | 5/2017 | Henry et al. | |
| 9,680,670 B2 | 6/2017 | Henry et al. | |
| 9,685,992 B2 * | 6/2017 | Bennett | H04B 3/54 |
| 9,705,561 B2 | 7/2017 | Henry et al. | |
| 9,705,571 B2 | 7/2017 | Gerszberg et al. | |
| 9,742,462 B2 | 8/2017 | Bennett et al. | |
| 9,748,626 B2 | 8/2017 | Henry et al. | |
| 9,749,053 B2 | 8/2017 | Henry et al. | |
| 9,768,833 B2 | 9/2017 | Fuchs et al. | |
| 9,769,020 B2 | 9/2017 | Henry et al. | |
| 9,780,834 B2 | 10/2017 | Henry et al. | |
| 9,793,951 B2 | 10/2017 | Henry et al. | |
| 9,793,954 B2 | 10/2017 | Bennett et al. | |
| 9,847,566 B2 | 12/2017 | Henry et al. | |
| 9,853,342 B2 | 12/2017 | Henry et al. | |
| 9,860,075 B1 | 1/2018 | Gerszberg et al. | |
| 9,865,911 B2 | 1/2018 | Henry et al. | |
| 9,866,309 B2 | 1/2018 | Bennett et al. | |
| 9,871,282 B2 | 1/2018 | Henry et al. | |
| 9,871,283 B2 | 1/2018 | Henry et al. | |
| 9,876,264 B2 | 1/2018 | Barnickel et al. | |
| 9,876,570 B2 | 1/2018 | Henry et al. | |
| 9,876,605 B1 | 1/2018 | Henry et al. | |
| 9,882,257 B2 | 1/2018 | Henry et al. | |
| 9,893,795 B1 | 2/2018 | Henry et al. | |
| 9,912,381 B2 | 3/2018 | Bennett et al. | |
| 9,917,341 B2 | 3/2018 | Henry et al. | |
| 9,991,580 B2 | 6/2018 | Henry et al. | |
| 9,997,819 B2 | 6/2018 | Bennett et al. | |
| 9,998,172 B1 | 6/2018 | Barzegar et al. | |
| 9,998,870 B1 | 6/2018 | Bennett et al. | |
| 9,999,038 B2 | 6/2018 | Barzegar et al. | |
| 10,003,364 B1 | 6/2018 | Willis, III et al. | |
| 10,009,063 B2 | 6/2018 | Gerszberg et al. | |
| 10,009,065 B2 | 6/2018 | Henry et al. | |
| 10,009,067 B2 | 6/2018 | Birk et al. | |
| 10,009,901 B2 | 6/2018 | Gerszberg | |
| 10,027,397 B2 | 7/2018 | Kim | |
| 10,027,427 B2 | 7/2018 | Vannucci et al. | |
| 10,033,107 B2 | 7/2018 | Henry et al. | |
| 10,033,108 B2 | 7/2018 | Henry et al. | |
| 10,044,409 B2 | 8/2018 | Barzegar et al. | |
| 10,051,483 B2 | 8/2018 | Barzegar et al. | |
| 10,051,488 B1 | 8/2018 | Vannucci et al. | |
| 10,062,970 B1 | 8/2018 | Vannucci et al. | |
| 10,069,535 B2 | 9/2018 | Vannucci et al. | |
| 10,079,661 B2 | 9/2018 | Gerszberg et al. | |
| 10,090,606 B2 | 10/2018 | Henry et al. | |
| 10,096,883 B2 | 10/2018 | Henry et al. | |
| 10,103,777 B1 | 10/2018 | Henry et al. | |
| 10,103,801 B2 | 10/2018 | Bennett et al. | |
| 10,123,217 B1 | 11/2018 | Barzegar et al. | |
| 10,129,057 B2 | 11/2018 | Willis, III et al. | |
| 10,135,145 B2 | 11/2018 | Henry et al. | |
| 10,136,434 B2 | 11/2018 | Gerszberg et al. | |
| 10,142,086 B2 | 11/2018 | Bennett et al. | |
| 10,148,016 B2 | 12/2018 | Johnson et al. | |
| 10,154,493 B2 | 12/2018 | Bennett et al. | |
| 10,170,840 B2 | 1/2019 | Henry et al. | |
| 10,171,158 B1 | 1/2019 | Barzegar et al. | |
| 10,200,106 B1 | 2/2019 | Barzegar et al. | |
| 10,205,212 B2 | 2/2019 | Henry et al. | |
| 10,205,231 B1 | 2/2019 | Henry et al. | |
| 10,205,655 B2 | 2/2019 | Barzegar et al. | |
| 10,224,981 B2 | 3/2019 | Henry et al. | |
| 10,230,426 B1 | 3/2019 | Henry et al. | |
| 10,230,428 B1 | 3/2019 | Barzegar et al. | |
| 10,243,270 B2 | 3/2019 | Henry et al. | |
| 10,244,408 B1 | 3/2019 | Vannucci et al. | |
| 10,264,586 B2 | 4/2019 | Beattie, Jr. et al. | |
| 10,276,907 B2 | 4/2019 | Bennett et al. | |
| 10,284,261 B1 | 5/2019 | Barzegar et al. | |
| 10,291,286 B2 | 5/2019 | Henry et al. | |
| 10,305,190 B2 | 5/2019 | Britz et al. | |
| 10,305,192 B1 | 5/2019 | Rappaport | |
| 10,305,197 B2 | 5/2019 | Henry et al. | |
| 10,312,567 B2 | 6/2019 | Bennett et al. | |
| 10,320,586 B2 | 6/2019 | Henry et al. | |
| 10,326,495 B1 | 6/2019 | Barzegar et al. | |
| 10,340,573 B2 | 7/2019 | Johnson et al. | |
| 10,340,600 B2 | 7/2019 | Henry et al. | |
| 10,340,979 B1 | 7/2019 | Barzegar et al. | |
| 10,348,391 B2 | 7/2019 | Bennett et al. | |
| 10,355,745 B2 | 7/2019 | Henry et al. | |
| 10,361,489 B2 | 7/2019 | Britz et al. | |
| 10,371,889 B1 | 8/2019 | Barzegar et al. | |
| 10,374,277 B2 | 8/2019 | Henry et al. | |
| 10,374,278 B2 | 8/2019 | Henry et al. | |
| 10,374,281 B2 | 8/2019 | Henry et al. | |
| 10,374,316 B2 | 8/2019 | Bennett et al. | |
| 10,389,029 B2 | 8/2019 | Henry et al. | |
| 10,389,037 B2 | 8/2019 | Johnson et al. | |
| 10,389,403 B2 | 8/2019 | Henry et al. | |
| 10,389,419 B2 | 8/2019 | Johnson et al. | |
| 10,405,199 B1 | 9/2019 | Henry et al. | |
| 10,411,356 B2 | 9/2019 | Johnson et al. | |
| 10,411,920 B2 | 9/2019 | Henry et al. | |
| 10,424,845 B2 | 9/2019 | Johnson et al. | |
| 10,439,290 B2 | 10/2019 | Adriazola et al. | |
| 10,446,899 B2 | 10/2019 | Henry et al. | |
| 10,446,936 B2 | 10/2019 | Henry et al. | |
| 10,454,151 B2 | 10/2019 | Henry et al. | |
| 10,469,156 B1 | 11/2019 | Barzegar et al. | |
| 10,469,192 B2 | 11/2019 | Wolniansky et al. | |
| 10,469,228 B2 | 11/2019 | Barzegar et al. | |
| 2002/0186694 A1 | 12/2002 | Mahajan et al. | |
| 2004/0113756 A1 | 6/2004 | Mollenkopf et al. | |
| 2004/0218688 A1 | 11/2004 | Santhoff et al. | |

(56) References Cited

U.S. PATENT DOCUMENTS

| | | |
|---|---|---|
| 2005/0042989 A1 | 2/2005 | Ho et al. |
| 2005/0258920 A1 | 11/2005 | Elmore et al. |
| 2006/0083269 A1 | 4/2006 | Kang et al. |
| 2006/0187023 A1 | 8/2006 | Iwamura et al. |
| 2007/0054622 A1* | 3/2007 | Berkman ............... H04B 3/542 |
| | | 455/67.11 |
| 2008/0064331 A1 | 3/2008 | Washiro et al. |
| 2008/0125036 A1 | 5/2008 | Konya et al. |
| 2008/0211727 A1 | 9/2008 | Elmore et al. |
| 2009/0079660 A1 | 3/2009 | Elmore et al. |
| 2009/0258652 A1 | 10/2009 | Lambert et al. |
| 2009/0311960 A1 | 12/2009 | Farahani et al. |
| 2010/0265877 A1 | 10/2010 | Foxworthy et al. |
| 2010/0277003 A1 | 11/2010 | Von Novak et al. |
| 2011/0110404 A1 | 5/2011 | Washiro |
| 2011/0132658 A1* | 6/2011 | Miller, II .......... H04L 12/40013 |
| | | 174/70 R |
| 2011/0164514 A1 | 7/2011 | Afkhamie et al. |
| 2011/0187578 A1 | 8/2011 | Farneth et al. |
| 2011/0208450 A1 | 8/2011 | Salka et al. |
| 2011/0243255 A1 | 10/2011 | Paoletti |
| 2013/0003876 A1* | 1/2013 | Bennett ................ H04W 36/14 |
| | | 375/257 |
| 2013/0064311 A1* | 3/2013 | Turner ..................... H01P 3/00 |
| | | 375/259 |
| 2013/0077664 A1 | 3/2013 | Lee et al. |
| 2013/0109317 A1 | 5/2013 | Kikuchi et al. |
| 2013/0173807 A1 | 7/2013 | De Groot et al. |
| 2014/0167882 A1 | 6/2014 | Shinoda et al. |
| 2014/0285277 A1 | 9/2014 | Herbsommer et al. |
| 2016/0094879 A1 | 3/2016 | Gerszberg et al. |
| 2016/0099749 A1 | 4/2016 | Bennett |
| 2016/0182096 A1 | 6/2016 | Panioukov et al. |
| 2017/0033953 A1 | 2/2017 | Paul et al. |
| 2018/0048497 A1 | 2/2018 | Henry et al. |
| 2018/0054232 A1 | 2/2018 | Henry et al. |
| 2018/0054233 A1 | 2/2018 | Henry et al. |
| 2018/0054234 A1 | 2/2018 | Stuckman et al. |
| 2018/0062886 A1 | 3/2018 | Paul et al. |
| 2018/0069594 A1 | 3/2018 | Henry et al. |
| 2018/0069731 A1 | 3/2018 | Henry et al. |
| 2018/0074568 A1 | 3/2018 | Priyadarshi et al. |
| 2018/0076982 A1 | 3/2018 | Henry et al. |
| 2018/0077709 A1 | 3/2018 | Gerszberg |
| 2018/0108997 A1 | 4/2018 | Henry et al. |
| 2018/0108998 A1 | 4/2018 | Henry et al. |
| 2018/0108999 A1 | 4/2018 | Henry et al. |
| 2018/0115040 A1 | 4/2018 | Bennett et al. |
| 2018/0115058 A1 | 4/2018 | Henry et al. |
| 2018/0115060 A1 | 4/2018 | Bennett et al. |
| 2018/0115075 A1 | 4/2018 | Bennett et al. |
| 2018/0115081 A1 | 4/2018 | Johnson et al. |
| 2018/0123207 A1 | 5/2018 | Henry et al. |
| 2018/0123208 A1 | 5/2018 | Henry et al. |
| 2018/0123643 A1 | 5/2018 | Henry et al. |
| 2018/0123836 A1 | 5/2018 | Henry et al. |
| 2018/0151957 A1 | 5/2018 | Bennett et al. |
| 2018/0159195 A1 | 6/2018 | Henry et al. |
| 2018/0159228 A1 | 6/2018 | Britz et al. |
| 2018/0159229 A1 | 6/2018 | Britz |
| 2018/0159230 A1 | 6/2018 | Henry et al. |
| 2018/0159232 A1 | 6/2018 | Henry et al. |
| 2018/0159235 A1 | 6/2018 | Wolniansky |
| 2018/0159238 A1 | 6/2018 | Wolniansky |
| 2018/0159240 A1 | 6/2018 | Henry et al. |
| 2018/0159243 A1 | 6/2018 | Britz et al. |
| 2018/0166761 A1 | 6/2018 | Henry et al. |
| 2018/0166784 A1 | 6/2018 | Johnson et al. |
| 2018/0166785 A1 | 6/2018 | Henry et al. |
| 2018/0166787 A1 | 6/2018 | Johnson et al. |
| 2018/0167130 A1 | 6/2018 | Vannucci |
| 2018/0167927 A1 | 6/2018 | Beattie, Jr. et al. |
| 2018/0302162 A1 | 10/2018 | Gerszberg et al. |
| 2019/0013577 A1 | 1/2019 | Henry et al. |
| 2019/0013837 A1 | 1/2019 | Henry et al. |
| 2019/0074563 A1 | 3/2019 | Henry et al. |
| 2019/0074564 A1 | 3/2019 | Henry et al. |
| 2019/0074565 A1 | 3/2019 | Henry et al. |
| 2019/0074580 A1 | 3/2019 | Henry et al. |
| 2019/0074864 A1 | 3/2019 | Henry et al. |
| 2019/0074865 A1 | 3/2019 | Henry et al. |
| 2019/0074878 A1 | 3/2019 | Henry et al. |
| 2019/0081747 A1 | 3/2019 | Barzegar et al. |
| 2019/0104012 A1 | 4/2019 | Barzegar et al. |
| 2019/0104419 A1 | 4/2019 | Barzegar et al. |
| 2019/0104420 A1 | 4/2019 | Barzegar et al. |
| 2019/0115642 A1 | 4/2019 | Henry et al. |
| 2019/0123442 A1 | 4/2019 | Vannucci et al. |
| 2019/0123783 A1 | 4/2019 | Henry et al. |
| 2019/0131717 A1 | 5/2019 | Vannucci |
| 2019/0131718 A1 | 5/2019 | Vannucci |
| 2019/0140679 A1 | 5/2019 | Vannucci et al. |
| 2019/0141714 A1 | 5/2019 | Willis, III et al. |
| 2019/0150072 A1 | 5/2019 | Barzegar et al. |
| 2019/0173151 A1 | 6/2019 | Henry et al. |
| 2019/0173542 A1 | 6/2019 | Johnson et al. |
| 2019/0173601 A1 | 6/2019 | Wolniansky et al. |
| 2019/0174506 A1 | 6/2019 | Willis, III et al. |
| 2019/0181532 A1 | 6/2019 | Vannucci et al. |
| 2019/0181683 A1 | 6/2019 | Vannucci et al. |
| 2019/0296430 A1 | 9/2019 | Bennett et al. |
| 2019/0305413 A1 | 10/2019 | Henry et al. |
| 2019/0305592 A1 | 10/2019 | Vannucci et al. |
| 2019/0305820 A1 | 10/2019 | Barzegar et al. |
| 2019/0306057 A1 | 10/2019 | Barzegar et al. |

FOREIGN PATENT DOCUMENTS

| | | |
|---|---|---|
| WO | 8605327 A1 | 9/1986 |
| WO | 2013008292 A1 | 1/2013 |
| WO | 2016171914 A1 | 10/2016 |
| WO | 2018106455 A1 | 6/2018 |
| WO | 2018106684 A1 | 6/2018 |
| WO | 2018106915 A1 | 6/2018 |
| WO | 2019050752 A1 | 3/2019 |

OTHER PUBLICATIONS

"International Preliminary Report on Patentability", PCT/US15/48458, daed Apr. 13, 2017.

"International Search Report & Written Opinion", PCT/US2015/048458, dated Dec. 23, 2015.

"Transducer", IEEE Std 100-2000, Sep. 21, 2015, 1154.

Akalin, Tahsin et al., "Single-Wire Transmission Lines at Terahertz Frequencies", IEEE Transactions on Microwave Theory and Techniques, vol. 54, No. 6, 2006, 2762-2767.

Barlow, H. M. et al., "Surface Waves", 621.396.11 : 538.566, Paper No. 1482 Radio Section, 1953, pp. 329-341.

Corridor Systems, "A New Approach to Outdoor DAS Network Physical Layer Using E-Line Technology", Mar. 2011, 5 pages.

Goubau, Georg et al., "Investigation of a Surface-Wave Line for Long Distance Transmission", 1952, 263-267.

Goubau, Georg et al., "Investigations with a Model Surface Wave Transmission Line", IRE Transactions on Antennas and Propagation, 1957, 222-227.

Goubau, Georg , "Open Wire Lines", IRE Transactions on Microwave Theory and Techniques, 1956, 197-200.

Goubau, Georg, "Single-Conductor Surface-Wave Transmission Lines", Proceedings of the I.R.E., 1951, 619-624.

Goubau, Georg, "Surface Waves and Their Application to Transmission Lines", Radio Communication Branch, Coles Signal Laboratory, Mar. 10, 1950, 1119-1128.

Goubau, Georg, "Waves on Interfaces", IRE Transactions on Antennas and Propagation, Dec. 1959, 140-146.

Ren-Bin, Zhong et al., "Surface plasmon wave propagation along single metal wire", Chin. Phys. B, vol. 21, No. 11, May 2, 2012, 9 pages.

Sommerfeld, A., "On the propagation of electrodynamic waves along a wire", Annals of Physics and Chemistry New Edition, vol. 67, No. 2, 1899, 72 pages.

(56) References Cited

OTHER PUBLICATIONS

Wang, Kanglin, "Dispersion of Surface Plasmon Polaritons on Metal Wires in the Terahertz Frequency Range", Physical Review Letters, PRL 96, 157401, 2006, 4 pages.
"International Search Report and Written Opinion", PCT/US2018/015634, dated Jun. 25, 2018, 8 pages.
Villaran, Michael et al., "Condition Monitoring of Cables Task 3 Report: Condition Monitoring Techniques for Electric Cables", Brookhaven National Laboratory, Technical Report, Nov. 30, 2009, 89 pages.

\* cited by examiner

CIRCUIT PANEL NETWORK AND METHODS THEREOF

CROSS-REFERENCE TO RELATED APPLICATION

This application is a Continuation of and claims priority to U.S. patent application Ser. No. 14/505,580, filed Oct. 3, 2014. The contents of the foregoing is hereby incorporated by reference into this application as if set forth herein in full

TECHNICAL FIELD

The subject disclosure relates to providing network connectivity using a circuit panel distribution system.

BACKGROUND

Distribution of advanced telecommunication services within buildings and residences can be difficult and expensive. The buildings can be a variety of ages and some may not even support structured cabling. Depending on the size of the buildings, construction materials, and other factors that may cause interference, Wi-Fi and other wireless protocols may not provide sufficient network connectivity either. Almost all buildings and residences, however, have electrical service, and due to building code standards, nearly all structures have circuit panels that serve to distribute electrical power to various electrical circuits associated with the structure.

DETAILED DESCRIPTION

Figure 1:
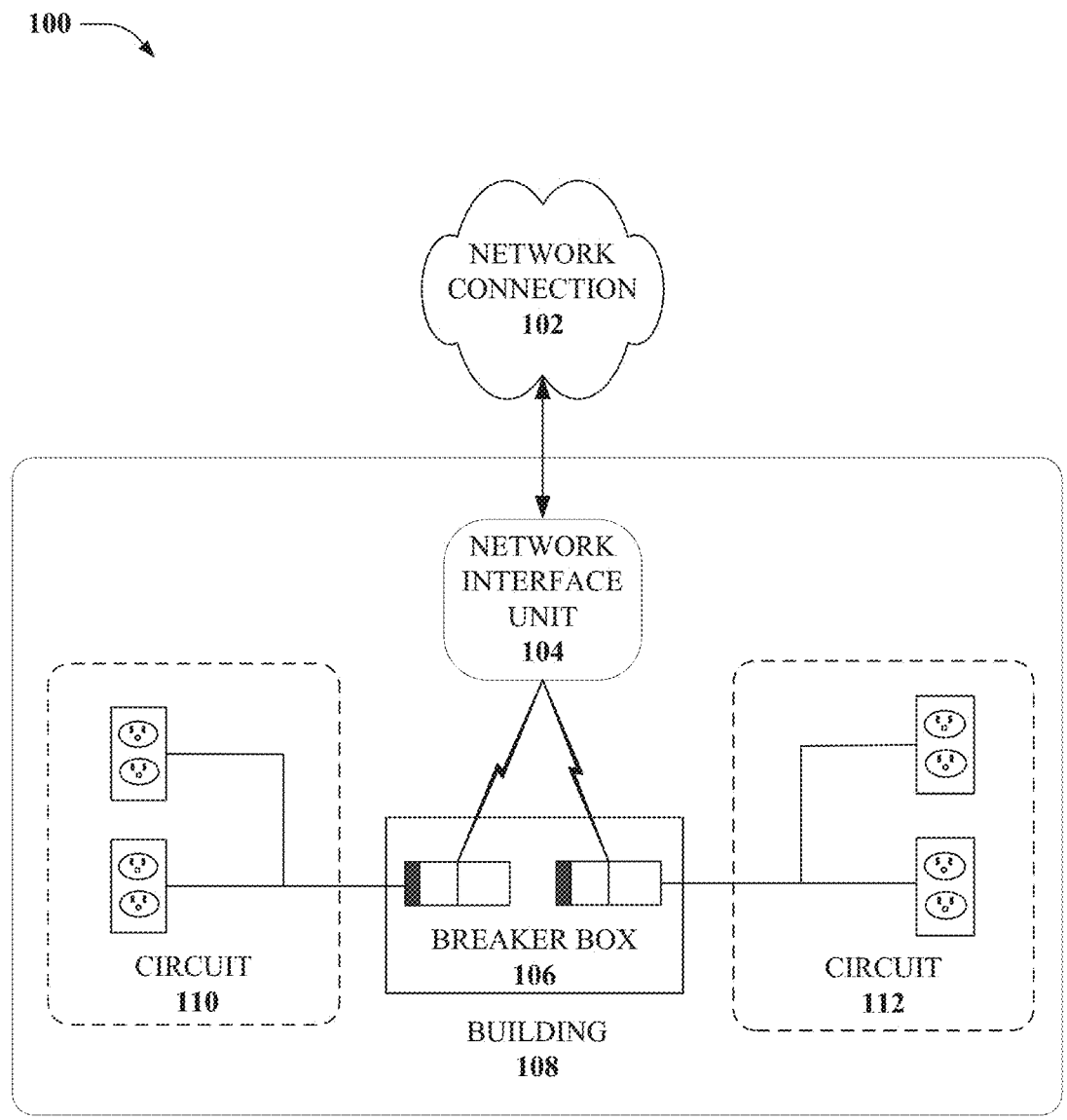
FIG. 1 is an example, non-limiting embodiment of a block diagram showing a circuit panel network system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To provide network connectivity in a building using existing electrical wiring and circuitry, a circuit panel network system is provided to interface between a network connection and the electrical circuit. Traditional breakers on the electrical panel that provide overload circuit-protection devices can be replaced with breaker devices that have transceivers and power line communication chipsets in addition to the overload circuit-protection devices. A network interface unit that receives broadband network connectivity from a network demarcation point inside or outside the building can wirelessly transfer data to and from the breaker devices, which then distribute the data over the electrical circuits via the power line communication chipsets on the breaker devices.

For these considerations as well as other considerations, in one or more embodiments, a system includes a processor and a memory to store executable instructions that when executed by the processor, facilitate performance of operations, comprising receiving wirelessly a first transmission of data from a network interface device communicatively coupled to at least one of a set of breakers of the circuit panel, the set of breakers coupled to a plurality of electrical circuits, and wherein the at least one of the set of breakers includes at least one circuit breaker device configured for power line communication. The operations also include initiating, based upon the determining, a second transmission of the wireless data as a power line communication transmission via the at least one circuit breaker device that is associated with at least one of the plurality of electrical circuits.

In another embodiment, a circuit breaker device is provided that comprises a receiver configured to receive a wireless transmission, wherein the wireless transmission comprises a packet including data and header information indicating a recipient device for the packet. The circuit breaker device also comprises a controller configured to determine that the recipient device is communicably coupled to an electrical circuit associated with the circuit breaker device. The circuit breaker device also comprises a power line communication chipset configured to transmit the packet on the electrical circuit.

In another embodiment, a method includes receiving, from a network interface device communicably coupled to a circuit breaker device, a wireless transmission that comprises a packet that includes a header frame indicating a target address. The method can also include determining, by the circuit breaker device, that the target address is associated with a client device of an electrical circuit associated with the circuit breaker device. The method can also include transmitting, by the circuit breaker device, the packet to the client device via the electrical circuit in response to determining that the client device is connected to the electrical circuit.

Turning now to FIG. 1, illustrated is an example, non-limiting embodiment of a block diagram showing a circuit panel network system 100 in accordance with various aspects described herein. The circuit panel network system 100 distributes, facilitates, or enables a broadband network connection (received via network connection 102) or other network connection throughout a building 108 using electrical circuits in a building 108 (e.g., electrical circuits 110 and 112). 'Smart' breaker devices in breaker box 106 can receive the transmissions sent from a network interface unit 104 and using built-in power line communications chipsets, forward the transmissions over one or both of the electrical circuits 110 and 112.

The system 100 includes a network interface unit 104 that receives network connectivity via network connection 102 to a network, such as a broadband access network, a media distribution network, a guided wave communication network or other communication network. The network connection 102 can be a wireless communication network connection, coaxial cable connection, DSL, fiber, or other traditional broadband access connection (e.g., for Internet or other private/public network access) that terminates insides or outside the building 108, before being distributed through the building 108. In an embodiment, the network interface unit 104 can be a device at the network demarcation point such as what is commonly called a network interface device ("NID"). The network demarcation point is where the public network wiring ends and the onsite premise wiring begins. In the embodiment shown in FIG. 1, network interface unit 104 is located inside the building. In other embodiments (e.g., FIG. 2), the network demarcation point can be outside the building, including being affixed to an exterior wall of the building. In addition, the network interface unit 104 can provide wired connections, wireless connections, or a combination of wired and wireless connections without departing from example embodiments.

Network interface unit 104 can comprise hardware such as a modem that modulates/demodulates conversion between an analog signal and digital signal, and frequency converters. In an embodiment, the network interface unit 104 can contain hardware that converts between the cable/DSL/fiber network protocol to an IEEE 802.xx protocol, or other networking protocol that can be applied for residential/commercial networking. Network interface unit 104 can also comprise components that transfer transmissions conforming to a wide area network protocol to a local area network ("LAN") protocol.

In an embodiment, network interface unit 104 can include a transceiver that transmits and receives communications sent to and from circuit breaker devices in breaker box 106. The transceiver can be a wireless transceiver and transmit using one or more near field communication ("NFC") protocols, BLUETOOTH wireless technology, optical/infrared, microwave and/or other short range or line of sight communications. These wireless transmissions can be sent to and from breaker devices with compatible transceivers built into these circuit breaker devices.

It is to be appreciated that while FIG. 1 depicts wireless transmissions originating from network interface unit 104 directly, in other embodiments, other configurations are possible. For instance, if breaker box 106 is made of metal, and/or has a metal cover, this can form an effective Faraday cage, and wireless transmissions can be heavily attenuated or even blocked within the breaker box 106. In such cases, an antenna can be built into the breaker box (e.g., on a circuit panel cover). Such an embodiment can be seen in more detail in FIG. 4. It is also to be appreciated that while breaker box 106 shows only two breaker devices, this is merely for ease of display, and in other embodiments, other numbers of breaker devices are possible.

In an embodiment, the circuit breaker devices in breaker box 106 can contain power line communication chipsets that forward the transmissions received from the network interface unit 104 on to the electrical circuits 110 and 112. In an embodiment, the power line communication chipsets can be a chipset that conforms to IEEE 1901 such as HOMEPLUG power line networking, HOMEPLUG AV2 power line networking and etc. When transmissions are received via the network interface unit 104, the power line communications chipsets on the breaker devices can modulate and/or send packets of data over the electrical circuits 110 and 112. Any device communicably coupled to electrical outlets on the associated electrical circuits can receive the communications. It is to be appreciated that even though FIG. 1 shows each of the electrical circuits 110 and/or 112 with two electrical outlets, this is merely for an exemplary embodiment, and in other embodiments, other numbers of electrical outlets are possible. Additionally, the electrical circuits 110 and/or 112 are shown as being within the building 108, but in some embodiments, electrical circuits 110 and 112 and even breaker box 106 can be partially or completely outside of the building 108. Also, this circuit panel switching system 100 does not require a building and some embodiments without buildings are possible.

Each of electrical circuits 110 and 112 become collision domains associated with the circuit breaker devices on breaker box 106. Collision domains are sections of a network where data packets can collide with one another when being sent on a shared medium. Since packets can collide with each other, packets are sent one at a time. By the same measure, the electrical circuits 110 and 112 collectively form a broadcast domain associated with the breaker box 106. In effect, each circuit breaker device and associated electrical circuit functions as a switch/router port on a LAN while electrical outlets associated with each of the electrical circuits function as hub ports.

It will be appreciated that while only circuits 110 and 112 are illustrated, many other circuits are available without departing from example embodiments. Likewise, while certain smart breaker devices are illustrated for breaker box 106 in FIG. 1, additional smart breaker devices may be available in accordance with various configurations for example embodiments. Moreover, while network interface unit 104 is illustrated separately from the smart breaker devices in breaker box 106, the network interface unit can be incorporated into one or more breaker devices without departing from example embodiments. Indeed, one or more of the smart breaker devices could serve as the network interface unit 104 that communicates with other smart breaker devices. It will also be appreciated that one or more of the smart breaker devices could likewise include routing functionality such that support not only broadcast communications to circuits 110 and 112, but also routed communications to specified ones of circuits 110 and 112.

Figure 2:
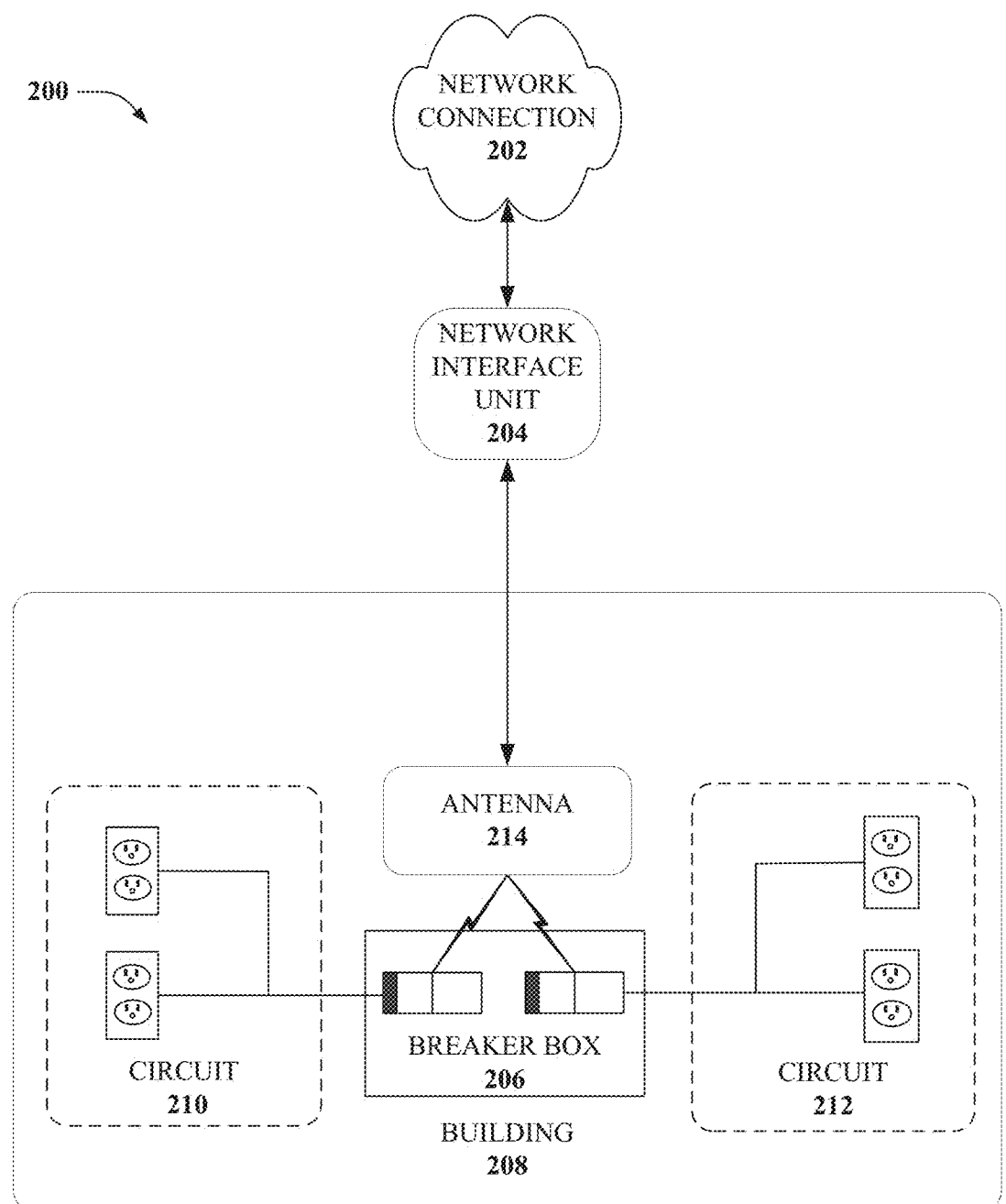
FIG. 2 is an example, non-limiting embodiment of a block diagram showing a circuit panel network system in accordance with various aspects described herein.

Turning now to FIG. 2, illustrated is an example, non-limiting embodiment of a block diagram showing a circuit panel network system 200 in accordance with various aspects described herein. The circuit panel network system 200 distributes a broadband network connection (received via network connection 202) through a building 208 using electrical circuits in a building (e.g., electrical circuits 210 and 212). 'Smart' breaker devices in breaker box 206 can receive the transmissions sent from a network interface unit 204 and using built in power line communications chipsets, forward the transmissions over the electrical circuits 210 and 212.

A difference between this embodiment and the embodiment in FIG. 1 is that the network interface unit 204 is located outside the building 208. Placing the network interface unit 204 outside of the building allows for easier access during installation of the network interface unit 204. In some embodiments, the network interface unit 204 can wirelessly communicate with breaker devices in breaker box 206 from outside of the building, or from some distance away depending on the wireless communication method. In other embodiments though, an antenna 214 can be provided to transmit and receive the wireless signals to and from breaker box 206 and then can pass the communications to network interface unit 204 via a wired connection. The antenna can be placed inside the building, or even within the breaker box 206 (e.g., attached to the inside of the panel cover or elsewhere).

Figure 3:
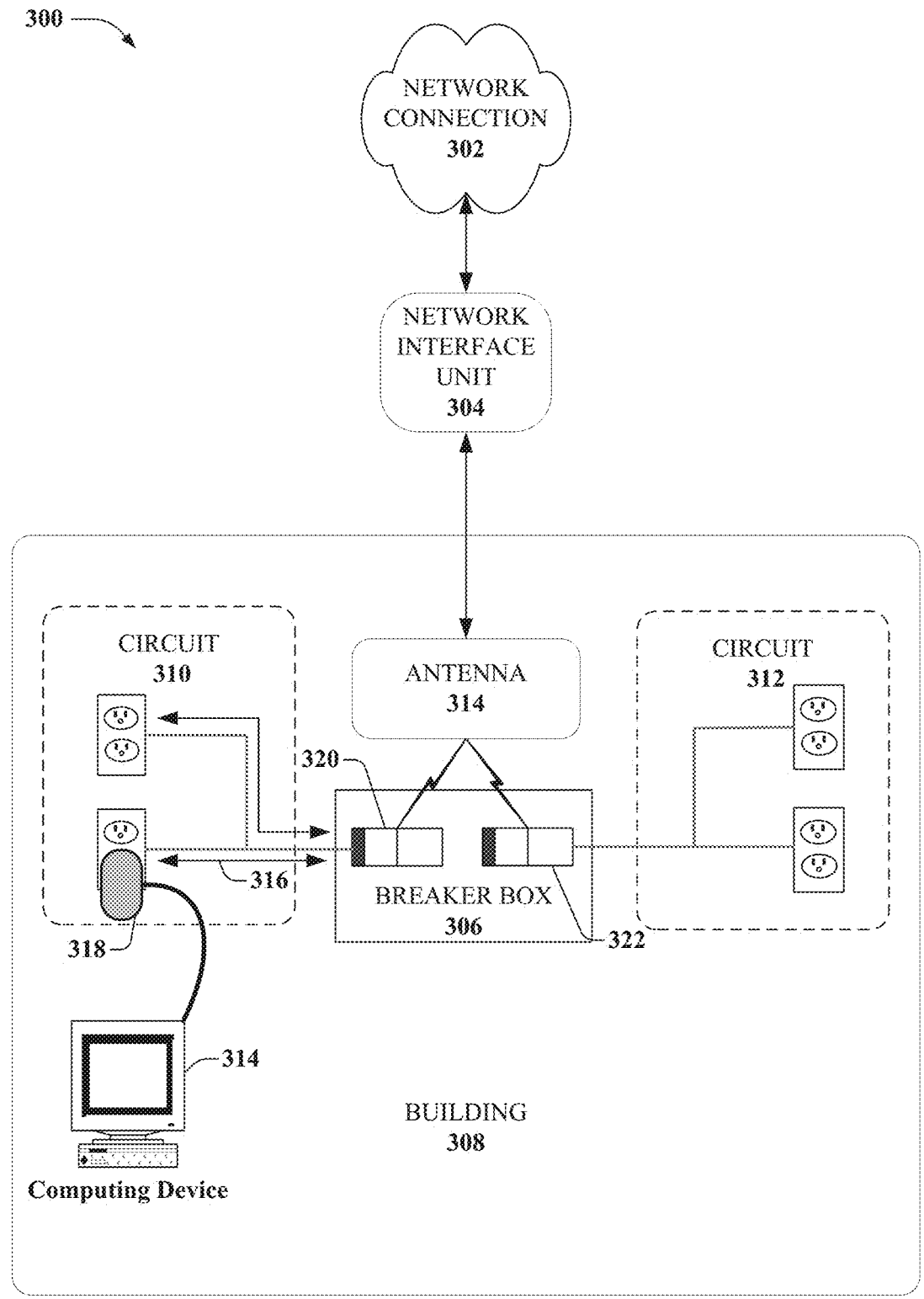
FIG. 3 is an example, non-limiting embodiment of a block diagram showing a circuit panel network system in accordance with various aspects described herein.

Turning now to FIG. 3, illustrated is an example, non-limiting embodiment of a block diagram showing a circuit panel network system 300 in accordance with various aspects described herein. The circuit panel system 300 distributes a broadband network connection (received via network connection 302) through a building 308 using electrical circuits in a building (e.g., electrical circuits 310 and 312). Circuit breaker devices, such as the 'smart' breaker devices or other breaker devices 320 and 322 in breaker box 306 can receive the transmissions sent from a network interface unit 304 and antenna 314 and using built in power line communications chipsets, forward the transmissions over the electrical circuits 310 and 312. In the embodiment shown in FIG. 3, however, the breakers devices 320 and 322 selectively transmit the data over electrical circuits 310 and 312.

In an embodiment, breaker devices 320 and 322 can learn the identities, via media access control ("MAC") addresses (or other network IDs or network address), of client devices attached to the electrical outlets, such as computing device 314, or other client device such as a television, a set top box or other device that communications via network connection 302. MAC addresses, which are unique identifiers assigned to network interfaces for communications on the physical network segment can be used to positively identify devices that are plugged into the electrical circuits 310 and 312. These MAC addresses can be mapped to IP addresses and as communications are received by the breaker device 320 and 322 specifying IP addresses, those communications can be forwarded by the corresponding breaker device to the electrical circuit in which the MAC address corresponding to the IP address is located. It will be appreciated that other network addressing schemes can be utilized without departing from example embodiments.

An example of how this works can be as follows. A packet of data is received at the network interface unit 304. The network interface unit 304 passes the packet wirelessly to both of breaker devices 320 and 322. A header on the packet of data states that the intended recipient (computing device 314) has a specific address (IP or otherwise). Breaker device 320 determines that the intended recipient is on electrical circuit 310 by mapping the address specified in the packet header to a MAC address that corresponds to the MAC address of the client device to receive the data, such as the computing device 314. Breaker device 320 then sends out transmission 316 via the onboard power line communication chipset and a receiver power line communication chipset 318 receives transmission 316 and modulates the transmission to an Ethernet signal for computing device 314. Breaker device 322, upon determining that the intended recipient is not connected to electrical circuit 312 does not send a transmission over circuit 312.

The network interface unit 304 can also perform Dynamic Host Configuration Protocol (DHCP) where devices can be assigned dynamic, or temporary IP addresses on the network. Network interface unit 304 can thus forward packets to the breaker devices in breaker box 306 accordingly. The network interface unit 304 can therefore take on router functions rather than simply mapping MAC addresses to static IP addresses.

In an embodiment, the MAC address determination and mapping can be performed by the network interface unit 304, and then the wireless transmissions from the antenna 314 and/or network interface 304 can be selectively sent to breaker device 320 and not breaker device 322. In another embodiment, the wireless transmission can be sent to both breaker devices, but header information or more generally, metadata in the transmission associated with the packet data can indicate which of breaker devices 320 or 322 should modulate the transmission on the electrical circuits.

Figure 4:
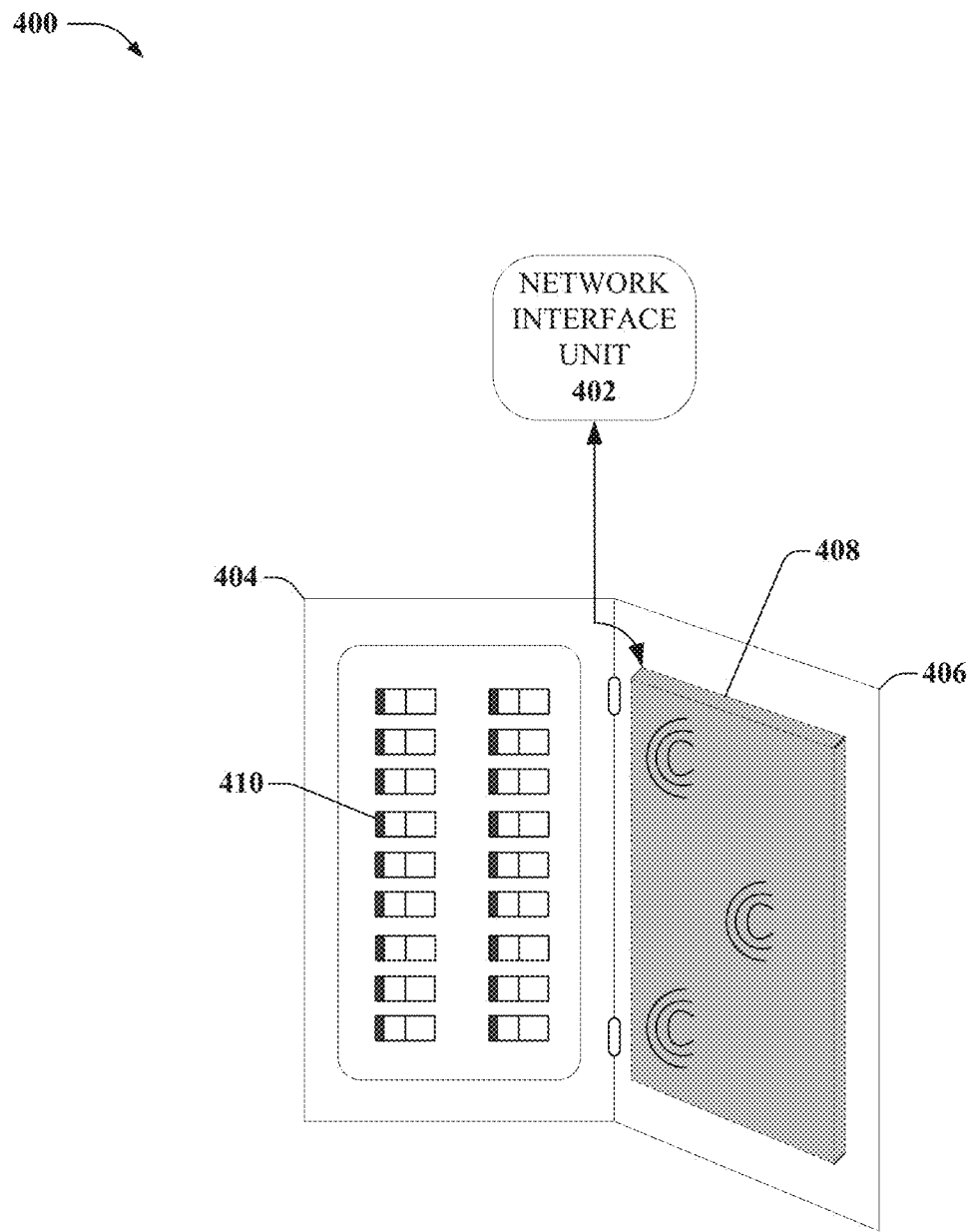
FIG. 4 is an example, non-limiting embodiment of a block diagram showing a circuit panel transmitter in accordance with various aspects described herein.

Turning now to FIG. 4, illustrated is an example, non-limiting embodiment of a block diagram 400 showing a circuit panel transmitter in accordance with various aspects described herein. In an embodiment where the circuit panel 404 is metallic and/or otherwise would prevent network interface unit 402 from directly wirelessly transmitting to breaker devices 410, an antenna and/or transceiver 408 can be mounted on panel cover 406 of the circuit panel 404. Thus, even when the panel cover is closed, network interface unit 402 can still send and receive communications to and from breaker devices 410. Network interface unit 402 can be connected to antenna/transceiver 408 by a wired connection.

The transceiver 408 can be a wireless transceiver and transmit using one or more near field communication ("NFC") protocols, BLUETOOTH wireless technology, optical/infrared, microwave and/or other short range or line of sight communications. In an embodiment, the transceiver electronic circuitry can be located on the network interface unit 402 and antenna 408 merely converts electronic signals to and from electromagnetic radiation. In other embodiments, transceiver 408 contains the electronic circuitry.

In an embodiment, the antenna 408 can send and receive wireless transmissions to or from all of the breaker devices 410 at once, or can selectively send or receive wireless transmissions to or from one or more of the breaker devices 410. The antenna 408 can be comprised of multiple antennas distributed so as to communicate with one or more of the breaker devices 410.

Figure 5:
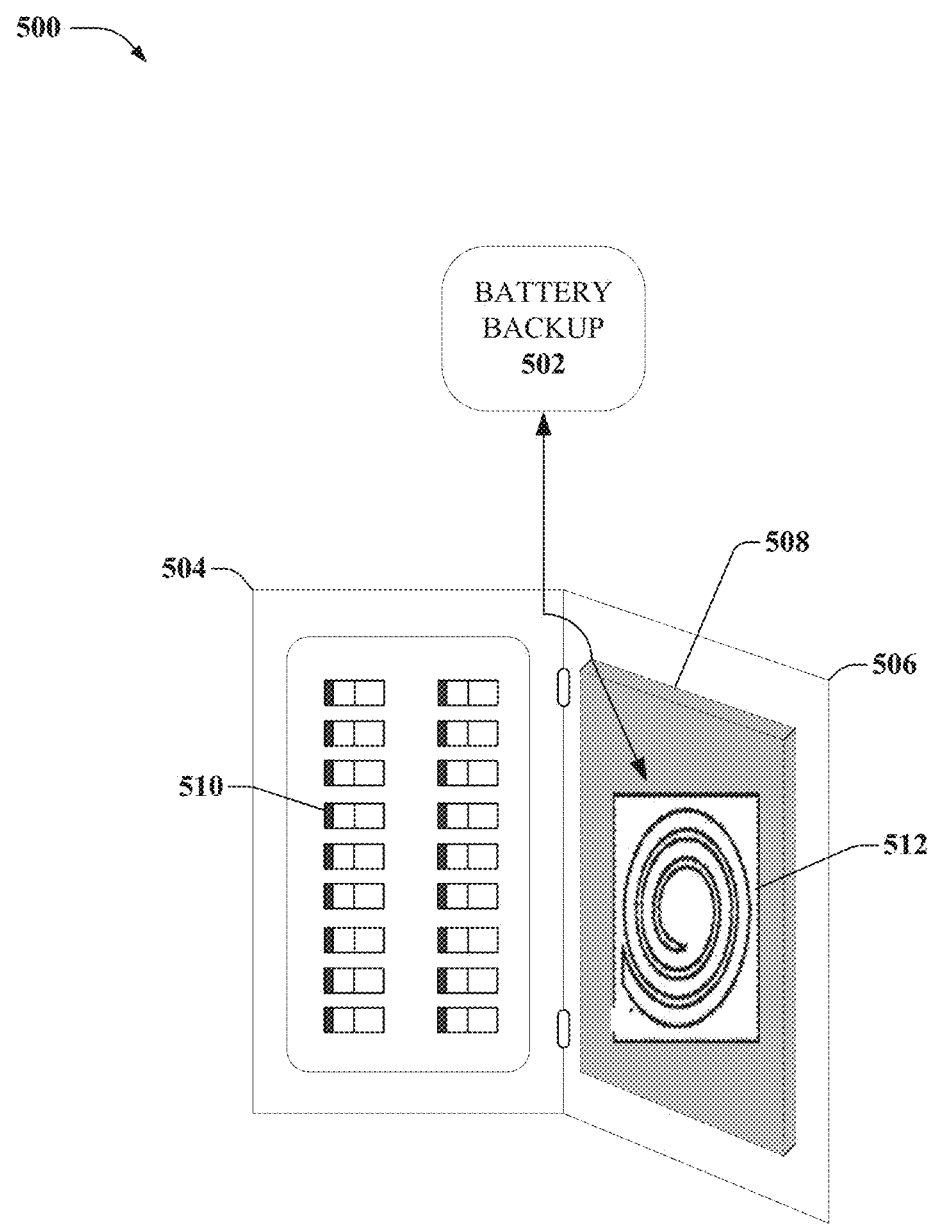
FIG. 5 is an example, non-limiting embodiment of a block diagram showing a battery backup system in accordance with various aspects described herein.

Turning now to FIG. 5, illustrated is an example, non-limiting embodiment of a block diagram showing a battery backup system 500 in accordance with various aspects described herein. When power outages occur, a battery backup device 502 can provide backup power to the breaker devices 510. The panel cover 506 to circuit panel 504 can have panel 508 that inductively provides power to breaker devices 510 via induction loop 512. Corresponding induction loops on the breaker devices 510 (not shown) can then receive power from the battery backup 502.

The battery backup 502 can be connected to the mains in order to detect a power outage. In response to detecting the outage, the battery backup 502 can then be activated. In an embodiment, the battery backup can maintain the charge on the battery using the mains connection.

Figure 6:
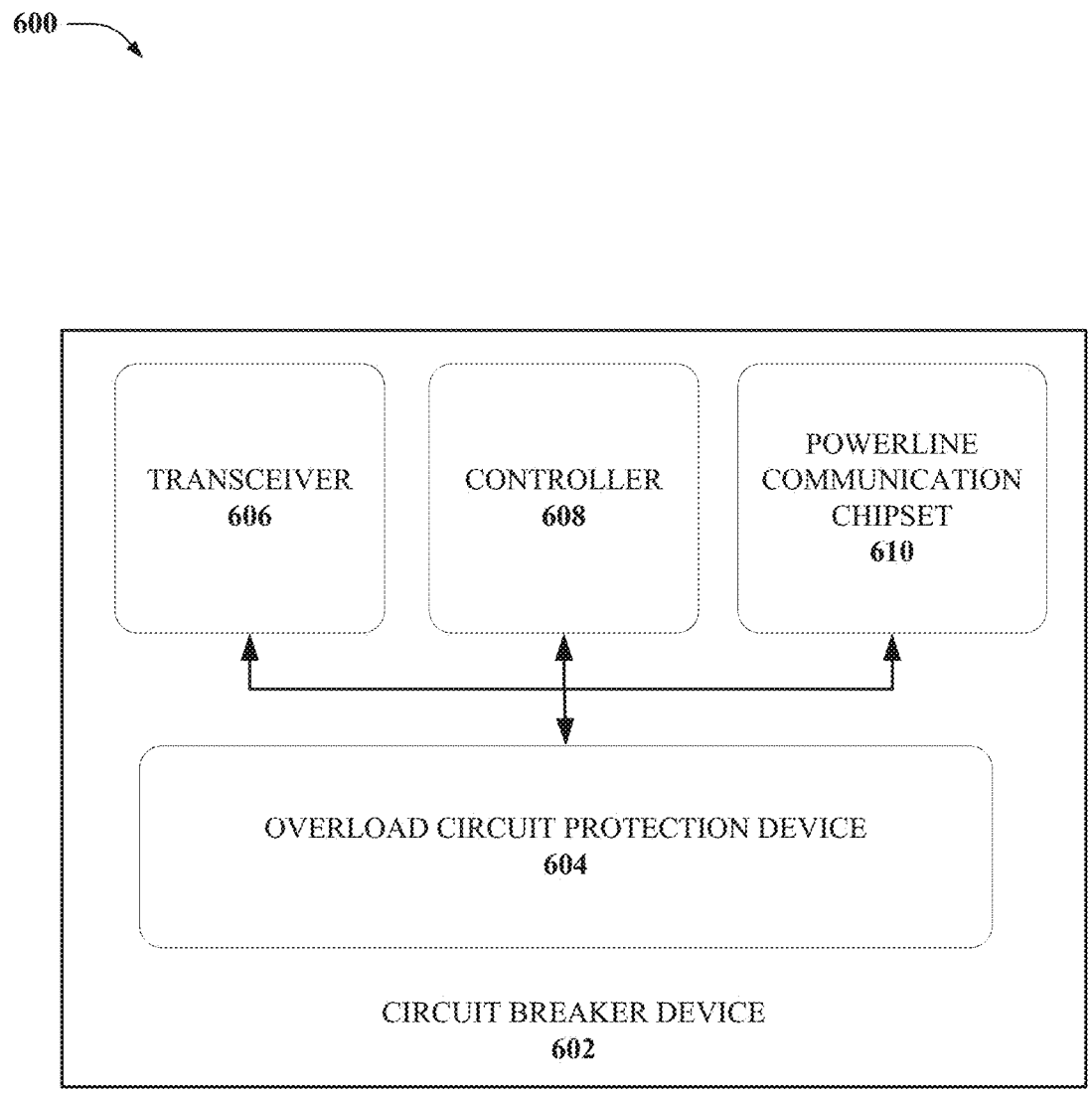
FIG. 6 is an example, non-limiting embodiment of a block diagram showing a circuit breaker device in accordance with various aspects described herein.

Turning now to FIG. 6, illustrated is an example, non-limiting embodiment of a block diagram 600 showing a circuit breaker device 602 in accordance with various aspects described herein.

In addition to including the overload circuit protection device 604 that is normally found in a circuit breaker, circuit breaker device 602 comprises a transceiver 606 that sends and receives communications from a network interface unit (e.g., network interface unit 104, 204, 304, and 402). The transceiver 606 can be a wireless transceiver and transmit and receive using one or more near field communication ("NFC") protocols, BLUETOOTH wireless technology, optical/infrared, microwave and/or other short range or line of sight communications. The transceiver 606 can communicate either directly with the network interface unit or with an antenna/transceiver located nearby or on the inside of the circuit panel cover. In some embodiments, the transceiver 606 can send and receive transmissions from other circuit breaker devices on the circuit panel.

A controller 608 can determine which client devices (e.g., computing device 314) are connected to an electrical circuit associated with the circuit breaker device 602. The controller 608 can ping the devices and/or examine packets received from the devices, such as DHCP discover requests sent by a client device on bootup or after a service interruption or other packets to determine a MAC address or other address (e.g., IP, device identity, subscriber ID, or other identifier) associated with the client device.

In an embodiment, the controller 608 also provides a control point for a service provider, and various access controls such as virtual LANs or P-bits can be added or stripped from packets passing through the circuit breaker device 602.

Once the wireless transmissions are received by the transceiver 606, a controller 608 can determine which collision domain or electrical circuit the transmission is associated with. The controller 608 can examine a header frame or other metadata in the packet and/or transmission to determine a target address of the intended recipient of the packet. The controller can determine whether or not the intended recipient is on the associated electrical circuit by mapping the address specified in the packet header to a MAC address that corresponds to the MAC address of computing device.

In response to determining that the intended recipient is on the associated electrical circuit, power line communication chipset 610 can send the packet as a power line transmission over the electrical circuit. In a similar manner, the power line communication chipset 610 can also receive transmissions sent via the electrical circuit from power line communication chipsets associated with the device and the transceiver 606 can transmit the received transmission back to the network interface unit. The power line communication chipset 610 can be a chipset that conforms to IEEE 1901 such as HOMEPLUG power line networking, HOMEPLUG AV2 power line networking and etc.

In an embodiment, the power line communication chipset 610 can maintain a connection with the electrical circuit, and continue to send and receive power line transmissions even when the overload circuit protection device has tripped.

Figure 7:
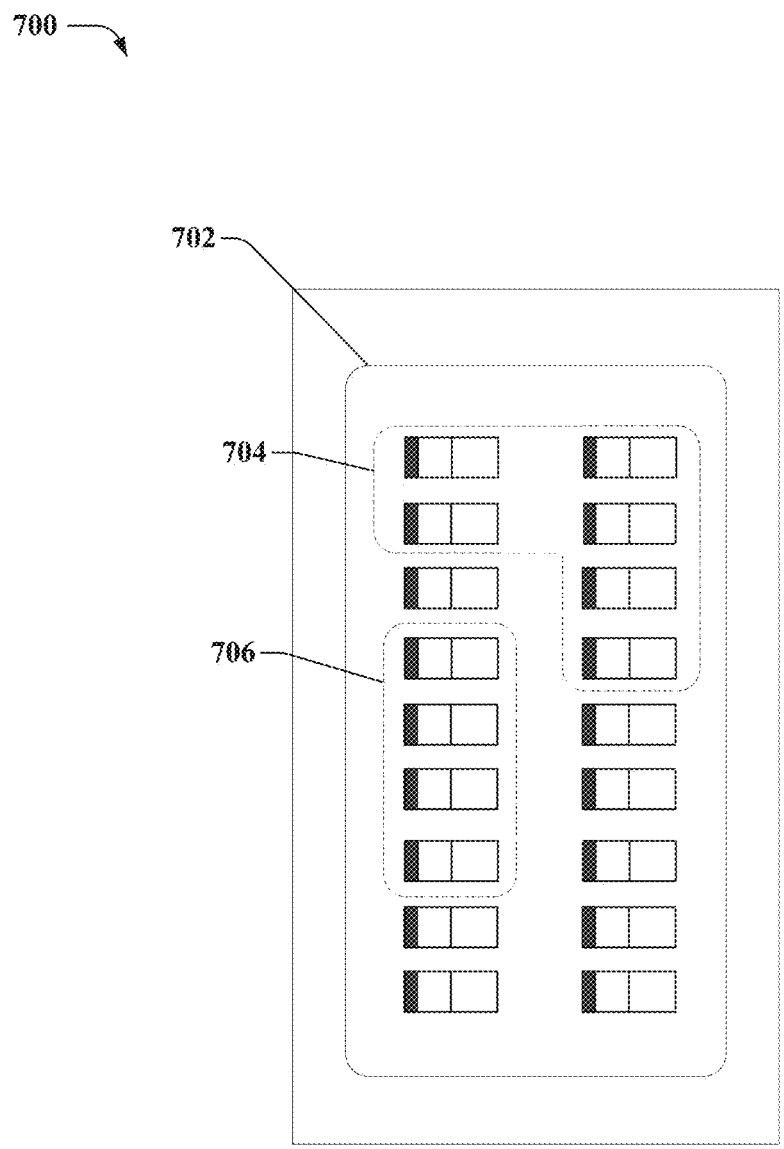
FIG. 7 is an example, non-limiting embodiment of a block diagram showing a circuit panel network system in accordance with various aspects described herein.

Turning now to FIG. 7, illustrated is an example, non-limiting embodiment of a block diagram showing a circuit panel network system 700 in accordance with various aspects described herein.

In an embodiment, the set of breaker devices 702 and the network interface unit can provide layer 3 functionality to the circuit panel network. The breaker devices can send transmissions between themselves in some embodiments, or can use network interface units as a relay when communicating with other breaker devices.

A service provider or user can assign a subnet to two or more of the breaker devices. This can be used in a multi-tenant building that has a shared electrical panel where each tenant has two or more electrical circuits. In an example, subnet 704, which is composed of 6 breaker devices, can be distinct from subnet 706. Communications between breakers in subnet 704 can be freely passed but they may not be able to communicate with other breakers on the circuit panel.

Figure 8:
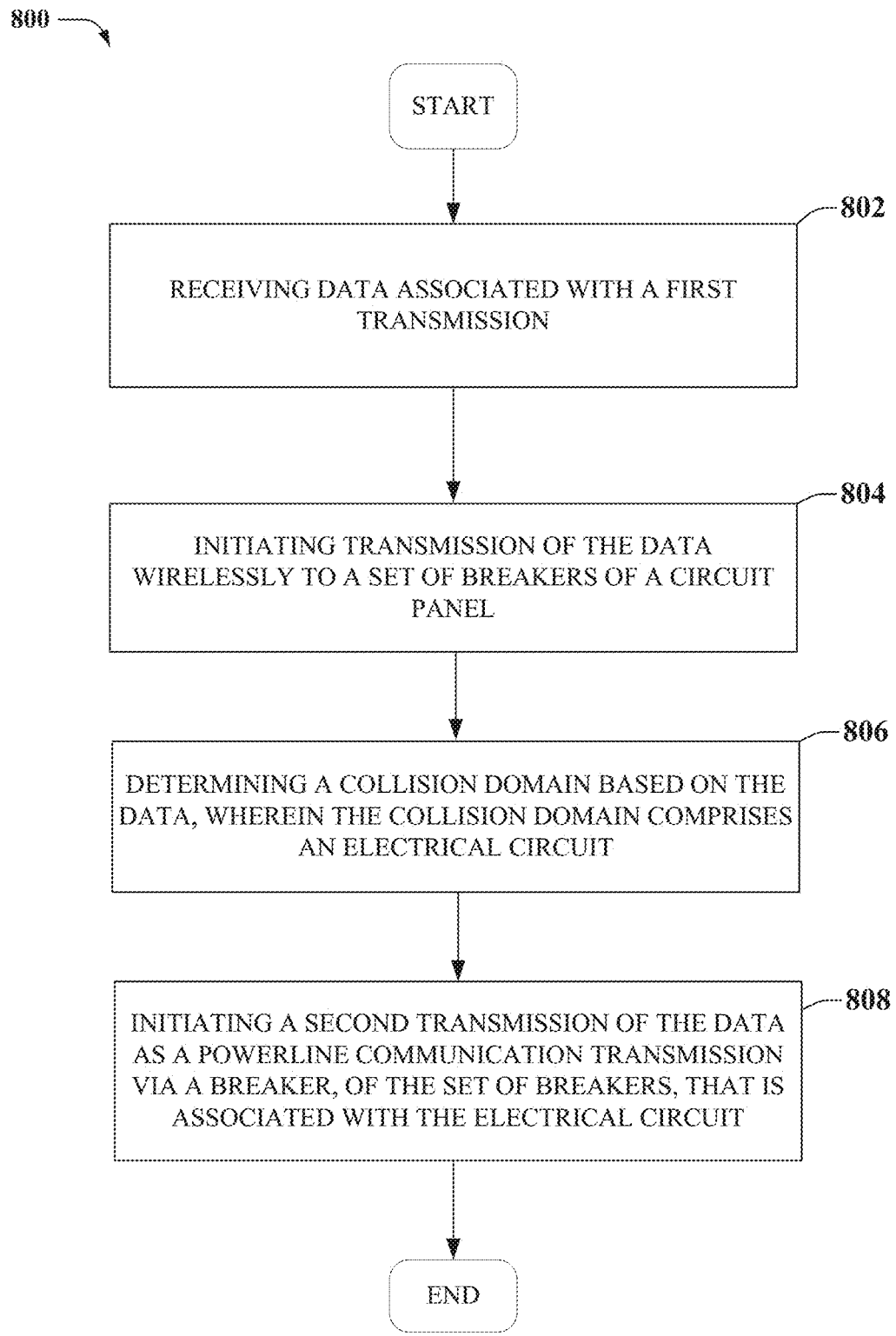
FIG. 8 illustrates a flow diagram of an example, non-limiting embodiment of a method for routing data using a circuit panel network as described herein.

FIG. 8 illustrates a process in connection with the aforementioned systems. The process in FIG. 8 can be implemented for example by systems 100-700 as illustrated in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow diagram of an example, non-limiting embodiment of a method 800 for routing data using a circuit panel network as described herein.

Method 800 can start at step 802 where data is received (e.g., at network interface unit 104), where the data is associated with a first transmission. The transmission can be received via a coaxial cable connection, DSL, fiber, or other traditional broadband access connection that terminates insides or outside a building.

At step 804, a wireless transmission of the data is initiated (e.g., by network interface unit 204 via antenna/transceiver 214) to a set of breakers of a circuit panel. The transceiver can be a wireless transceiver and transmit using one or more near field communication ("NFC") protocols, BLUETOOTH wireless technology, optical/infrared, microwave and/or other short range or line of sight communications. These wireless transmissions can be sent to and from breaker devices with compatible transceivers built into the breaker devices.

At step 806, a collision domain is determined (e.g., by controller 608) based on the data, wherein the collision domain comprises an electrical circuit. The controller can examine a header frame or other metadata in the packet and/or transmission to determine a target address of the intended recipient of the packet. The controller can determine whether or not the intended recipient is on the associated electrical circuit by mapping the address specified in the packet header to a MAC address that corresponds to the MAC address of computing device.

At step 808, a second transmission of the data can be initiated (e.g., by power line communication chipset 610) as a power line communication transmission via a circuit breaker device included in the set of breakers, that is associated with the electrical circuit. The power line communication chipset can be a chipset that conforms to IEEE 1901 such as HOMEPLUG power line networking, HOMEPLUG AV2 power line networking and etc.

Figure 9:
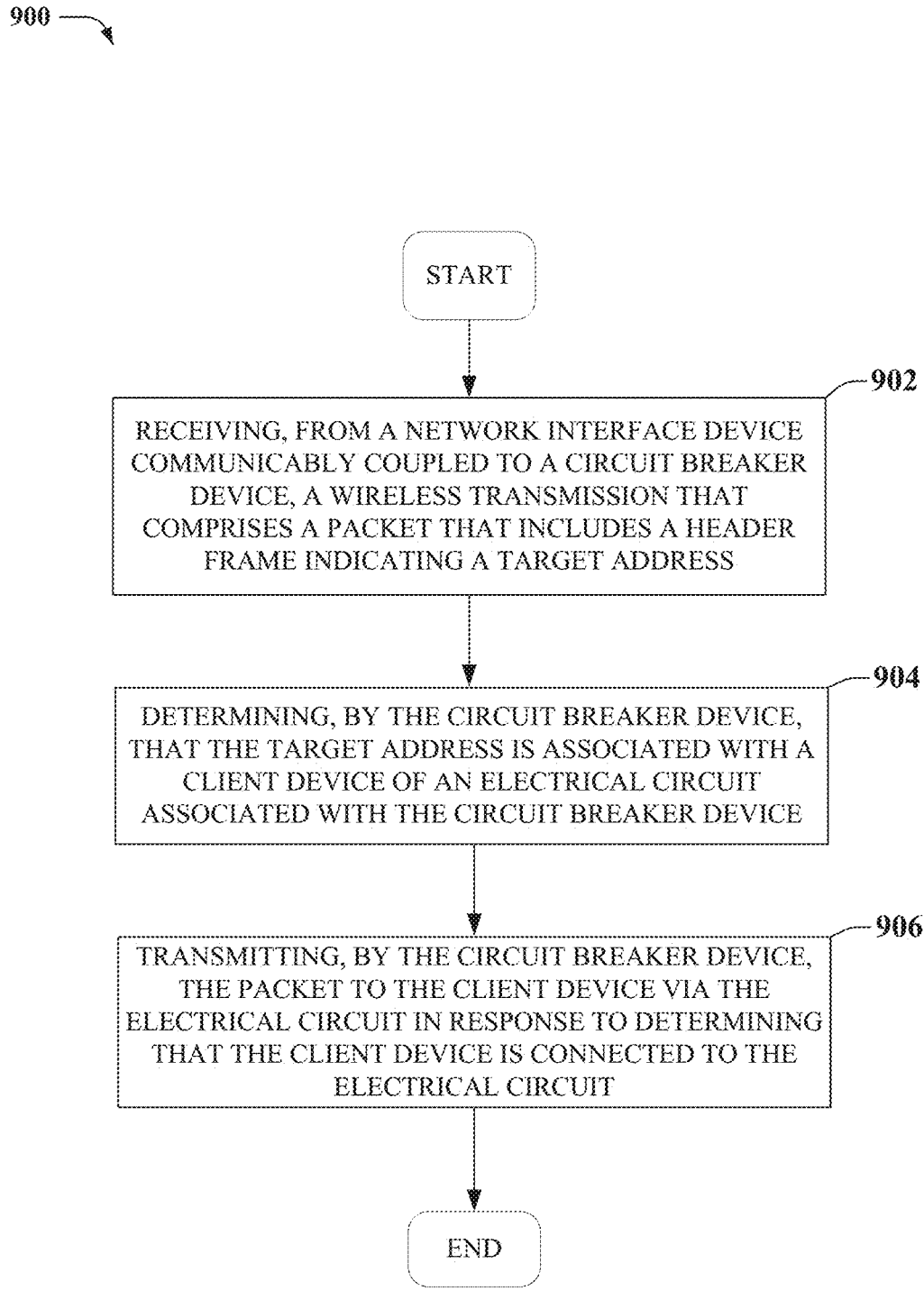
FIG. 9 illustrates a flow diagram of an example, non-limiting embodiment of a method for routing packets using a circuit breaker device as described herein.

Turning now to FIG. 9, illustrated is a flow diagram of an example, non-limiting embodiment of a method 900 for routing packets using a circuit breaker device as described herein.

Method 900 can begin at step 902 where a wireless transmission is received from a network interface device, where the wireless transmission comprises a packet that includes a header frame indicating a target address. At step 904, it is determined (e.g., by controller 608 on a circuit breaker device) that the target address is associated with a client device of an electrical circuit associated with the circuit breaker device. A controller can examine a header frame or other metadata in the packet and/or transmission to determine a target address of the intended recipient of the packet. The controller can determine whether or not the intended recipient is on the associated electrical circuit by mapping the address specified in the packet header to a MAC address that corresponds to the MAC address of computing device. At 906, the packet is transmitted, by the circuit breaker device, to the client device via the electrical circuit in response to determining that the client device is connected to the electrical circuit.

Figure 10:
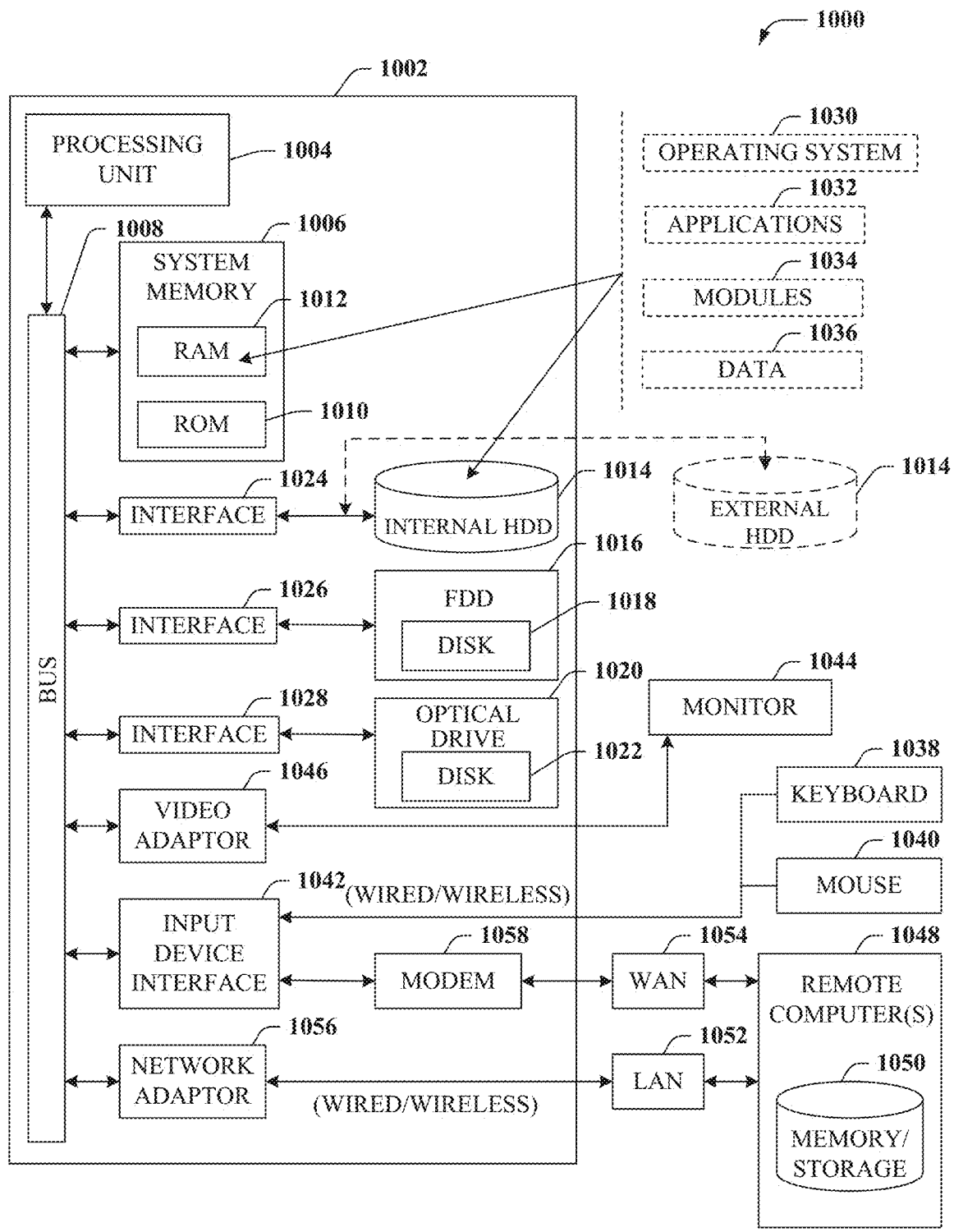
FIG. 10 is a block diagram of an example, non-limiting embodiment of a computing environment in accordance with various aspects described herein.

Referring now to FIG. 10, there is illustrated a block diagram of a computing environment in accordance with various aspects described herein. For example, in some embodiments, the computer can be or be included within the radio repeater system disclosed in any of the previous systems 200, 300, 400, 500, 600 and/or 700.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002 (e.g., computer 314, or network interface unit 104, 204, 304, 402 or circuit breaker device 602) the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 11:
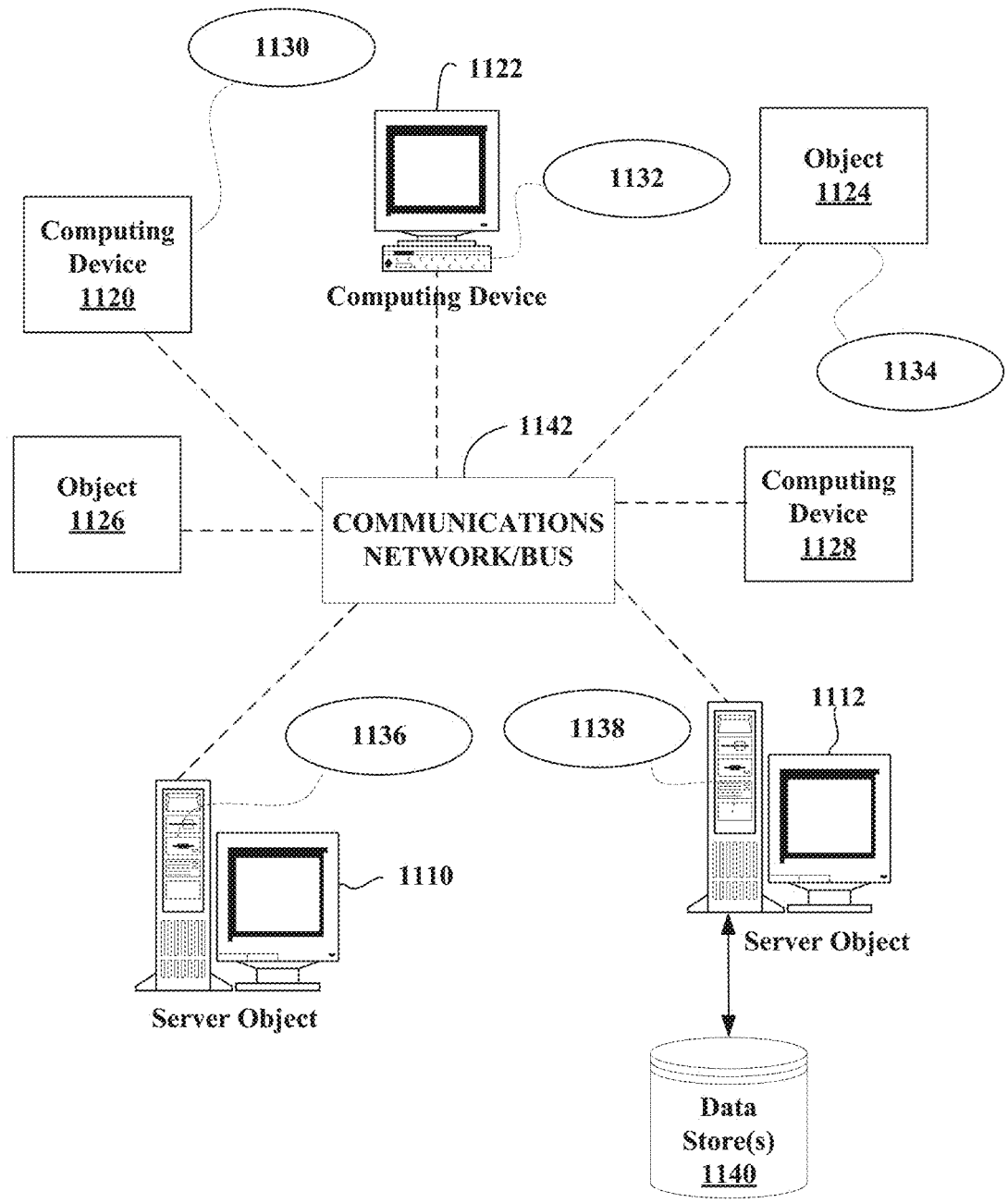
FIG. 11 is a block diagram of an example, non-limiting embodiment of a networking environment in accordance with various aspects described herein.

FIG. 11 provides a schematic diagram of an exemplary networked or distributed computing environment. The distributed computing environment comprises computing objects 1110, 1112, etc., and computing objects or devices 1120, 1122, 1124, 1126, 1128, etc., (computing device 314 is an example of one of these computing devices) which may include programs, methods, data stores, programmable logic, etc., as represented by applications 1130, 1132, 1134, 1136, 1138 and data store(s) 1140. It can be appreciated that computing objects 1110, 1112, etc., and computing objects or devices 1120, 1122, 1124, 1126, 1128, etc., may comprise different devices, including a multimedia display device, a monitor 1044 (FIG. 10) or similar devices depicted within the illustrations, or other devices such as a mobile phone, personal digital assistant (PDA), audio/video device, MP3 players, personal computer, laptop, etc. It should be further appreciated that data store(s) 1140 can include data store 1014 (FIG. 10), or other similar data stores disclosed herein.

Each computing object 1110, 1112, etc., and computing objects or devices 1120, 1122, 1124, 1126, 1128, etc., can communicate with one or more other computing objects 1110, 1112, etc., and computing objects or devices 1120, 1122, 1124, 1126, 1128, etc., by way of the communications network 1142 (e.g., by the circuit panel network system 100, 200, 300, and etc.), either directly or indirectly. Even though illustrated as a single element in FIG. 11, communications network 1142 may comprise other computing objects and computing devices that provide services to the system of FIG. 11, and/or may represent multiple interconnected networks, which are not shown. Each computing object 1110, 1112, etc., or computing object or devices 1120, 1122, 1124, 1126, 1128, etc., can also contain an application, such as applications 1130, 1132, 1134, 1136, 1138, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc., can be thought of as clients and computing objects 1110, 1112, etc., can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1142 or bus is the Internet, for example, the computing objects 1110, 1112, etc., can be Web servers with which other computing objects or devices 1120, 1122, 1124, 1126, 1128, etc., communicate via any of a number of known protocols, such as the hypertext transfer protocol (HTTP). Computing objects 1110, 1112, etc., acting as servers may also serve as clients, e.g., computing objects or devices 1120, 1122, 1124, 1126, 1128, etc., as may be characteristic of a distributed computing environment.

Various embodiments described herein relate to a single-wire communication system, such as a dielectric waveguide coupling system for launching and extracting guided wave (e.g., surface wave communications that are electromagnetic waves) transmissions from a wire or other single wire transmission medium. At millimeter-wave frequencies, wherein the wavelength is small compared to the size of the equipment, transmissions can propagate as waves guided by a strip or length of dielectric material. The electromagnetic field structure of the guided wave can be both inside and outside of the waveguide. However, in alternate embodiments, the electromagnetic structure of the guided wave can also be primarily inside or primarily outside of the waveguide as well. When this dielectric waveguide strip is brought into close proximity to a wire (e.g., a utility line or other transmission line), at least a portion of the guided waves decouples from the dielectric waveguide and couples to the wire, and continue to propagate as guided waves, such as surface waves about the surface of the wire. According to an example embodiment, a surface wave is a type of guided wave that is guided by a surface of the wire, which can include an exterior or outer surface of the wire, or another surface of the wire that is adjacent to or exposed to another type of medium having different properties (e.g., dielectric properties). Indeed, in an example embodiment, a surface of the wire that guides a surface wave can represent a transitional surface between two different types of media. For example, in the case of a bare or uninsulated wire, the surface of the wire can be the outer or exterior conductive surface of the bare or uninsulated wire that is exposed to air or free space. As another example, in the case of insulated wire, the surface of the wire can be the conductive portion of the wire that meets the insulator portion of the wire, or can otherwise be the insulator surface of the wire that is exposed to air or free space, or can otherwise be any material region between the insulator surface of the wire and the conductive portion of the wire that meets the insulator portion of the wire, depending upon the relative differences in the properties (e.g., dielectric properties) of the insulator, air, and/or the conductor. As described herein, insulated wire can refer to any metallic wire or cable with a dielectric coating or sheathing, regardless of the intended function of such dielectric coating. Such insulated wires can include in some embodiments, tree guard insulation and Hendrix insulation, among other varieties of insulation.

According to an example embodiment, guided waves such as surface waves can be contrasted with radio transmissions over free space/air or conventional propagation of electrical power or signals through the conductor of the wire. Indeed, with surface wave or guided wave systems described herein, conventional electrical power or signals can still propagate or be transmitted through the conductor of the wire, while guided waves (including surface waves and other electromagnetic waves) can propagate or be transmitted about the surface of the wire, according to an example embodiment. In an embodiment, a surface wave can have a field structure (e.g., an electromagnetic field structure) that lies primarily or substantially outside of the line or wire that serves to guide the surface wave.

According to an example embodiment, the electromagnetic waves traveling along the wire and around the outer surface of the wire are induced by other electromagnetic waves traveling along a waveguide in proximity to the wire. The inducement of the electromagnetic waves can be independent of any electrical potential, charge or current that is injected or otherwise transmitted through the wires as part of an electrical circuit. It is to be appreciated that while a small current in the wire may be formed in response to the propagation of the electromagnetic wave through the wire, this can be due to the propagation of the electromagnetic wave along the wire surface, and is not formed in response to electrical potential, charge or current that is injected into the wire as part of an electrical circuit. The electromagnetic waves traveling on the wire therefore do not require a circuit to propagate along the wire surface. The wire therefore is a single wire transmission line that is not part of a circuit. Also, in some embodiments, a wire is not necessary, and the electromagnetic waves can propagate along a single line transmission medium that is not a wire.

According to an example embodiment, the term "about" a wire used in conjunction with a guided wave (e.g., surface wave) can include fundamental wave propagation modes and other guided waves having a circular or substantially circular field distribution (e.g., electric field, magnetic field, electromagnetic field, etc.) at least partially around a wire. In addition, when a guided wave propagates "about" a wire, it can do so according to a wave propagation mode that includes not only the fundamental wave propagation modes (e.g., zero order modes), but additionally or alternatively other non-fundamental wave propagation modes such as higher-order guided wave modes (e.g., $1^{st}$ order modes, $2^{nd}$ order modes, etc.), asymmetrical modes and/or other guided (e.g., surface) waves that have non-circular field distributions around a wire. For example, such non-circular field distributions can be unilateral or multi-lateral with one or more axial lobes characterized by relatively higher field strength and/or one or more nulls or null regions characterized by relatively low-field strength, zero-field strength or substantially zero field strength. Further, the field distribution can otherwise vary as a function of a longitudinal axial orientation around the wire such that one or more regions of axial orientation around the wire have an electric or magnetic field strength (or combination thereof) that is higher than one or more other regions of axial orientation, according to an example embodiment. It will be appreciated that the relative positions of the wave higher order modes or asymmetrical modes can vary as the guided wave travels along the wire.

Figure 12:
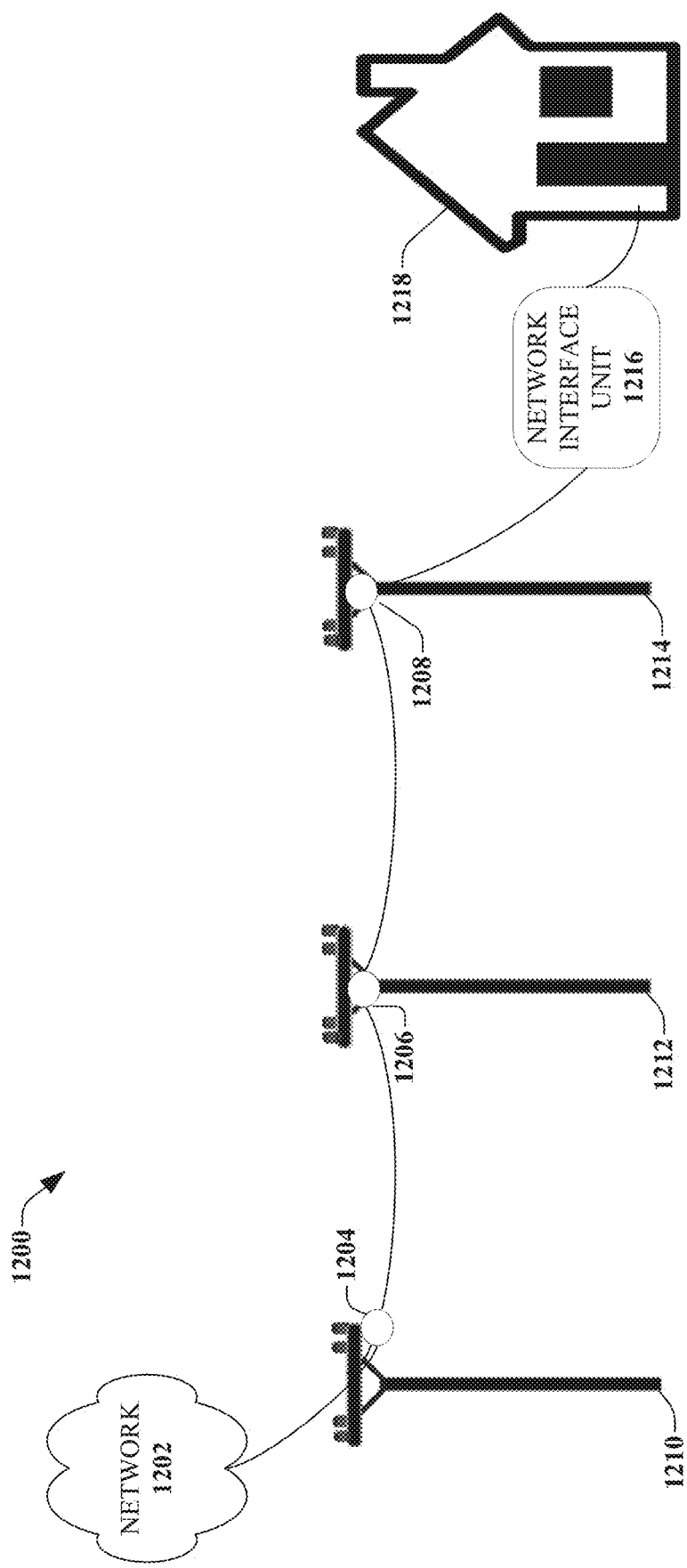
FIG. 12, is a block diagram illustrating an example, non-limiting embodiment of a guided wave communications system in accordance with various aspects described herein.

Referring now to FIG. 12, a block diagram illustrating an example, non-limiting embodiment of a guided wave communication system 1200 is shown. Guided wave communication system 1200 depicts an exemplary environment in which a dielectric waveguide coupling system can be used to provide network connectivity to network interface unit 1216 associated with a building 1218. The guided wave communication system 1200 which provides access to network 1202 can be an exemplary embodiment of the network connections 102, 202, and 302 shown in FIGS. 1-3 above.

Guided wave communication system 1200 can be a communication system that includes a dielectric waveguide coupling device 1204 that is communicably coupled to a network 1202. Dielectric waveguide coupling device 1204 can be connected by a wired (e.g., fiber and/or cable), or by a wireless (e.g., microwave wireless) network connection to network 1202. Dielectric waveguide coupling device 1204 can be mounted on, or attached to, utility pole 1210 or a wire/cable associated with utility pole 1210.

The dielectric waveguide coupling device 1204 can transmit the signal from network 1202 to network interface unit 1216 via utility or power line(s) that connect the utility poles 1210, 1212 and 1214. To transmit the signal, dielectric waveguide coupling device 1204 upconverts the signal (e.g., via frequency mixing) from network 1202 to a millimeter-wave band signal and the dielectric waveguide coupling device 1204 launches a millimeter-wave band wave that propagates as a guided electromagnetic wave (e.g., surface wave or other electromagnetic wave) traveling along the utility line or other wire. At utility pole 1212, another dielectric waveguide coupling device 1206 receives the guided wave (and optionally can amplify it as needed or desired) and sends it forward as a guided wave (e.g., surface wave or other electromagnetic wave) on the utility line or other wire to dielectric waveguide coupler 1208 which extract a signal from the millimeter-wave band guided wave and shift it down in frequency to the native frequency and provide network connectivity to network interface unit 1216 which then distributes network connectivity via a circuit panel network system in building 1218. Although not shown, the dielectric waveguide coupling device 1206 can also extract a signal from the millimeter-wave band guided wave and shift it down in frequency to the native frequency and dielectric waveguide coupler device 1206 can then provide network connectivity to another network interface unit.

In an embodiment, signals originating from one or more devices in building 1218 can be transferred to the network interface unit 1216 via the circuit panel network system 100, 200, or 300 described above with regard to FIG. 1, 2, or 3. These signals can then be converted/modulated by the dielectric waveguide coupling device 1208 into signals appropriate for transmission as guided electromagnetic surface waves on wires between utility poles 1214, 1212, and 1210. The modulated signal can contain networking information in a transmission header indicating a termination address. This termination address indicates an endpoint for the data, and can indicate whether or not one or more of dielectric waveguide coupling devices 1204 or 1206 should extract the signal from transmissions sent over the power lines. For instance, a device in building 1218 can send data to an IP address not associated with system 1200. Network interface unit 1216 can determine the IP address associated with the signal is not local, and can modify header information in the signal to indicate the non-local IP address. Thus, when the transmission is received by dielectric waveguide coupler device 1206, the signal is boosted and/or repeated without signal extraction, and dielectric waveguide coupler device 1204 receives the transmission and extracts the signal for delivery to network 1202.

In an example embodiment, system 1200 can employ diversity paths, where two or more utility lines or other wires are strung between the utility poles 1210, 1212, and 1214 (e.g., for example, two or more wires between poles 1210 and 1212). The utility lines or other wires can be either insulated or uninsulated, and depending on the environmental conditions that cause transmission losses, the coupling devices can selectively receive signals from the insulated or uninsulated utility lines or other wires. The selection can be based on measurements of the signal-to-noise ratio of the wires, or based on determined weather/environmental conditions (e.g., moisture detectors, weather forecasts, etc.). The use of diversity paths with system 1200 can enable alternate routing capabilities, load balancing, increased load handling, concurrent bi-directional or synchronous communications, spread spectrum communications, and etc.

It is noted that the use of the dielectric waveguide coupling devices 1204, 1206, and 1208 in FIG. 12 are by way of example only, and that in other embodiments, other uses are possible. For instance, dielectric waveguide coupling devices can be used in a backhaul communication system, providing network connectivity to base station devices. Dielectric waveguide coupling devices can also be used in many circumstances where it is desirable to transmit guided wave communications over a wire, whether insulated or not insulated. Dielectric waveguide coupling devices are improvements over other coupling devices due to no contact or limited physical and/or electrical contact with the wires. With dielectric waveguide coupling devices, the apparatus can be located away from the wire (e.g., spaced apart from the wire) and/or located on the wire so long as it is not electrically in contact with the wire, as the dielectric acts as an insulator, allowing for cheap, easy, and/or less complex installation.

It is further noted, that while dielectric waveguide coupler 1204, 1206, and 1208 and network interface unit 1216 are illustrated in an embodiment, other network configurations are likewise possible. For example, devices such as access points or other wireless gateways can be employed in a similar fashion to extend the reach of other networks such as a wireless local area network, a wireless personal area network or other wireless network that operates in accordance with a communication protocol such as a 802.11 protocol, WIMAX protocol, UltraWideband protocol, BLUETOOTH protocol, ZIGBEE protocol or other wireless protocol.

Figure 13:
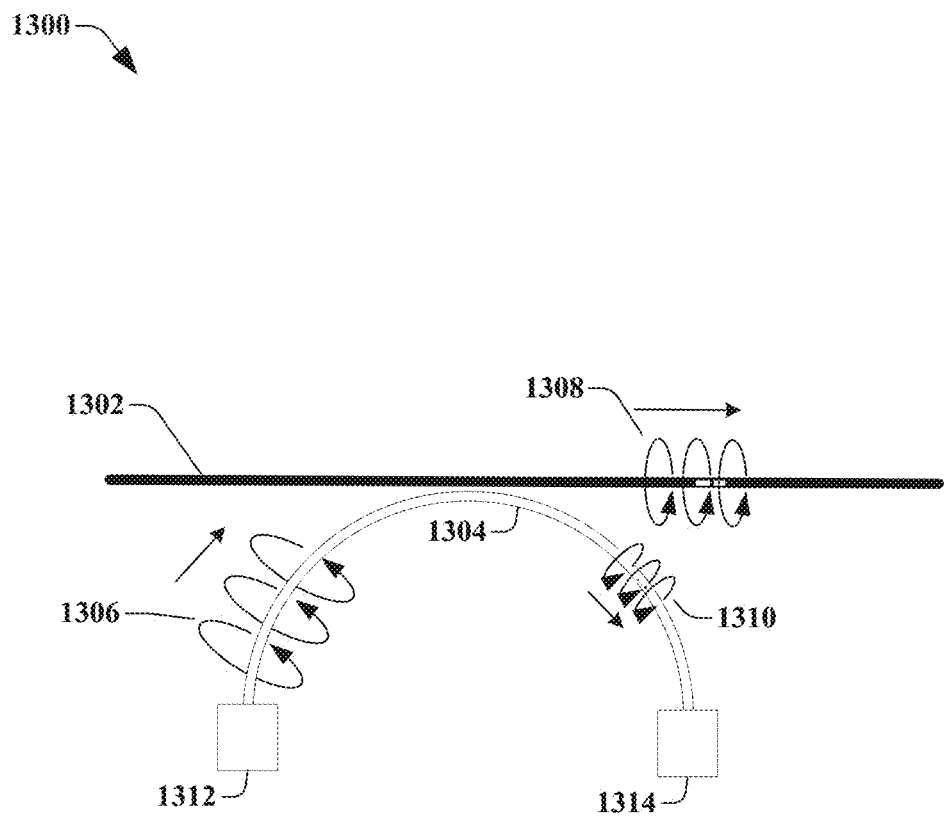
FIG. 13 is a block diagram illustrating an example, non-limiting embodiment of a dielectric waveguide coupler in accordance with various aspects described herein.

Turning now to FIG. 13, illustrated is a block diagram of an example, non-limiting embodiment of a dielectric waveguide coupling system 1300 in accordance with various aspects described herein. System 1300 provides a more detailed look at one or more of dielectric waveguide coupling devices 1204, 1206, and/or 1208 shown in FIG. 12 above. System 1300 comprises a dielectric waveguide 1304 that has a wave 1306 propagating as a guided wave about a waveguide surface of the dielectric waveguide 1304. In an embodiment, the dielectric waveguide 1304 is curved, and at least a portion of the waveguide 1304 can be placed near a wire 1302 in order to facilitate coupling between the waveguide 1304 and the wire 1302, as described herein. The dielectric waveguide 1304 can be placed such that a portion of the curved dielectric waveguide 1304 is parallel or substantially parallel to the wire 1302. The portion of the dielectric waveguide 1304 that is parallel to the wire can be an apex of the curve, or any point where a tangent of the curve is parallel to the wire 1302. When the dielectric waveguide 1304 is positioned or placed thusly, the wave 1306 travelling along the dielectric waveguide 1304 couples, at least in part, to the wire 1302, and propagates as guided wave 1308 around or about the wire surface of the wire 1302. The guided wave 1308 can be characterized as a surface wave or other electromagnetic wave, although other types of guided waves 1308 can supported as well without departing from example embodiments. A portion of the wave 1306 that does not couple to the wire 1302 propagates as wave 1310 along the dielectric waveguide 1304. It will be appreciated that the dielectric waveguide 1304 can be configured and arranged in a variety of positions in relation to the wire 1302 to achieve a desired level of coupling or non-coupling of the wave 1306 to the wire 1302. For example, the curvature and/or length of the dielectric waveguide 1304 that is parallel or substantially parallel, as well as its separation distance (which can include zero separation distance in an embodiment), to the wire 1302 can be varied without departing for example embodiments. Likewise, the arrangement of dielectric waveguide 1304 in relation to the wire 1302 may be varied based upon considerations of the respective intrinsic characteristics (e.g., thickness, composition, electromagnetic properties, etc.) of the wire 1302 and the dielectric waveguide 1304, as well as the characteristics (e.g., frequency, energy level, etc.) of the waves 1306 and 1308.

The guided wave 1308 stays parallel or substantially parallel to the wire 1302, even as the wire 1302 bends and flexes. Bends in the wire 1302 can increase transmission losses, which are also dependent on wire diameters, frequency, and materials. If the dimensions of the dielectric waveguide 1304 are chosen for efficient power transfer, most of the power in the wave 1306 is transferred to the wire 1302, with little power remaining in wave 1310. It will be appreciated that the guided wave 1308 can still be multi-modal in nature (discussed herein), including having modes that are non-fundamental or asymmetric, while traveling along a path that is parallel or substantially parallel to the wire 1302. In an embodiment, non-fundamental or asymmetric modes can be utilized to minimize transmission losses and/or obtain increased propagation distances.

It is noted that the term parallel is generally a geometric construct which often is not exactly achievable in real systems. Accordingly, the term parallel as utilized in the subject disclosure represents an approximation rather than an exact configuration when used to describe embodiments disclosed in the subject disclosure. In an embodiment, substantially parallel can include approximations that are within 30 degrees of true parallel in all dimensions.

In an embodiment, the wave 1306 can exhibit one or more wave propagation modes. The dielectric waveguide modes can be dependent on the shape and/or design of the waveguide 1304. The one or more dielectric waveguide modes of wave 1306 can generate, influence, or impact one or more wave propagation modes of the guided wave 1308 propagating along wire 1302. In an embodiment, the wave propagation modes on the wire 1302 can be similar to the dielectric waveguide modes since both waves 1306 and 1308 propagate about the outside of the dielectric waveguide 1304 and wire 1302 respectively. In some embodiments, as the dielectric waveguide mode couple to the wire 1302, the modes can change form due to differences in size, material, and/or impedances of the dielectric waveguide 1304 and wire 1302. The wave propagation modes can comprise the fundamental transverse electromagnetic mode (Quasi-TEM$_{00}$), where only small electric and/or magnetic fields extend in the direction of propagation, and the electric and magnetic fields extend radially outwards while the guided wave propagates along the wire. This guided wave mode can be donut shaped, where few of the electromagnetic fields exist within the dielectric waveguide 1304 or wire 1302. Waves 1306 and 1308 can comprise a fundamental TEM mode where the fields extend radially outwards, and also comprise other, non-fundamental (e.g., asymmetric, higher-level, etc.) modes. While particular wave propagation modes are discussed above, other wave propagation modes are likewise possible such as transverse electric (TE) and transverse magnetic (TM) modes, based on the frequencies employed, the design of the dielectric waveguide 1304, the dimensions and composition of the wire 1302, as well as its surface characteristics, its optional insulation, the electromagnetic properties of the surrounding environment, etc. It should be noted that, depending on the frequency, the electrical and physical characteristics of the wire 1302 and the particular wave propagation modes that are generated, guided wave 1308 can travel along the conductive surface of an oxidized uninsulated wire, an unoxidized uninsulated wire, an insulated wire and/or along the insulating surface of an insulated wire.

In an embodiment, a diameter of the dielectric waveguide 1304 is smaller than the diameter of the wire 1302. For the millimeter-band wavelength being used, the dielectric waveguide 1304 supports a single waveguide mode that makes up wave 1306. This single waveguide mode can change as it couples to the wire 1302 as surface 1308. If the dielectric waveguide 1304 were larger, more than one waveguide mode can be supported, but these additional waveguide modes may not couple to the wire 1302 as efficiently, and higher coupling losses can result. However, in some alternative embodiments, the diameter of the dielectric waveguide 1304 can be equal to or larger than the diameter of the wire 1302, for example, where higher coupling losses are desirable or when used in conjunction with other techniques to otherwise reduce coupling losses (e.g., impedance matching with tapering, etc.).

In an embodiment, the wavelength of the waves 1306 and 1308 are comparable in size, or smaller than a circumference of the dielectric waveguide 1304 and the wire 1302. In an example, if the wire 1302 has a diameter of 0.5 cm, and a corresponding circumference of around 1.5 cm, the wavelength of the transmission is around 1.5 cm or less, corresponding to a frequency of 20 GHz or greater. In another embodiment, a suitable frequency of the transmission and the carrier-wave signal is in the range of 30-100 GHz, perhaps around 30-60 GHz, and around 38 GHz in one example. In an embodiment, when the circumference of the dielectric waveguide 1304 and wire 1302 is comparable in size to, or greater, than a wavelength of the transmission, the waves 1306 and 1308 can exhibit multiple wave propagation modes including fundamental and/or non-fundamental (symmetric and/or asymmetric) modes that propagate over sufficient distances to support various communication systems described herein. The waves 1306 and 1308 can therefore comprise more than one type of electric and magnetic field configuration. In an embodiment, as the guided wave 1308 propagates down the wire 1302, the electrical and magnetic field configurations will remain the same from end to end of the wire 1302. In other embodiments, as the guided wave 1308 encounters interference or loses energy due to transmission losses, the electric and magnetic field configurations can change as the guided wave 1308 propagates down wire 1302.

In an embodiment, the dielectric waveguide 1304 can be composed of nylon, TEFLON polytetrafluoroethylene (PTFE), polyethylene, a polyamide, or other plastics. In other embodiments, other dielectric materials are possible. The wire surface of wire 1302 can be metallic with either a bare metallic surface, or can be insulated using plastic, dielectric, insulator or other sheathing. In an embodiment, a dielectric or otherwise non-conducting/insulated waveguide can be paired with either a bare/metallic wire or insulated wire. In other embodiments, a metallic and/or conductive waveguide can be paired with a bare/metallic wire or insulated wire. In an embodiment, an oxidation layer on the bare metallic surface of the wire 1302 (e.g., resulting from exposure of the bare metallic surface to oxygen/air) can also provide insulating or dielectric properties similar to those provided by some insulators or sheathings.

It is noted that the graphical representations of waves 1306, 1308 and 1310 are presented merely to illustrate the principles that wave 1306 induces or otherwise launches a guided wave 1308 on a wire 1302 that operates, for example, as a single wire transmission line. Wave 1310 represents the portion of wave 1306 that remains on the dielectric waveguide 1304 after the generation of guided wave 1308. The actual electric and magnetic fields generated as a result of such wave propagation may vary depending on the frequencies employed, the particular wave propagation mode or modes, the design of the dielectric waveguide 1304, the dimensions and composition of the wire 1302, as well as its surface characteristics, its optional insulation, the electromagnetic properties of the surrounding environment, etc.

It is noted that dielectric waveguide 1304 can include a termination circuit or damper 1314 at the end of the dielectric waveguide 1304 that can absorb leftover radiation or energy from wave 1310. The termination circuit or damper 1314 can prevent and/or minimize the leftover radiation from wave 1310 reflecting back toward transmitter circuit 1312. In an embodiment, the termination circuit or damper 1314 can include termination resistors, and/or other components that perform impedance matching to attenuate reflection. In some embodiments, if the coupling efficiencies are high enough, and/or wave 1310 is sufficiently small, it may not be necessary to use a termination circuit or damper 1314. For the sake of simplicity, these transmitter and termination circuits or dampers 1312 and 1314 are not depicted in the other figures, but in those embodiments, transmitter and termination circuits or dampers may possibly be used.

Further, while a single dielectric waveguide 1304 is presented that generates a single guided wave 1308, multiple dielectric waveguides 1304 placed at different points along the wire 1302 and/or at different axial orientations about the wire can be employed to generate multiple guided waves 1308 at the same or different frequencies, at the same or different phases, at the same or different wave propagation modes. The guided wave or waves 1308 can be modulated to convey data via a modulation technique such as phase shift keying, frequency shift keying, quadrature amplitude modulation, amplitude modulation, multi-carrier modulation and via multiple access techniques such as frequency division multiplexing, time division multiplexing, code division multiplexing, multiplexing via differing wave propagation modes and via other modulation and access strategies.

Figure 14:
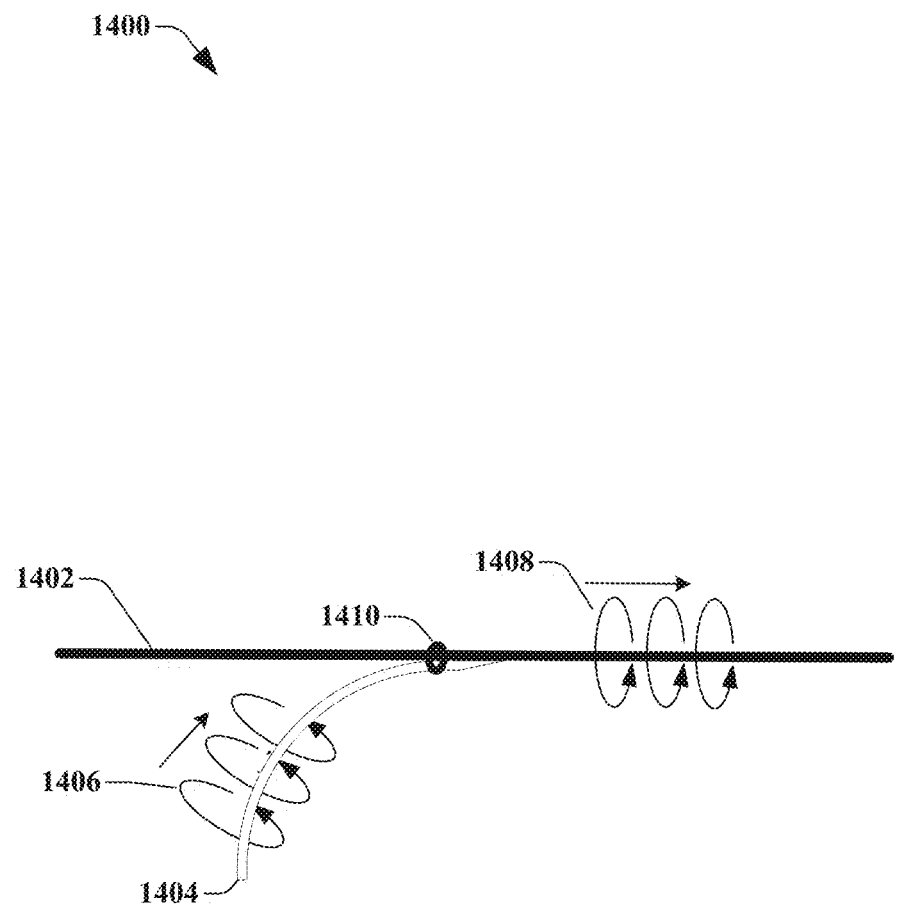
FIG. 14 is a block diagram illustrating an example, non-limiting embodiment of a dielectric waveguide coupler in accordance with various aspects described herein.

Turning now to FIG. 14, illustrated is a block diagram of an example, non-limiting embodiment of a dielectric waveguide coupling system 1400 in accordance with various aspects described herein. System 1400 can be another embodiment of one or more of dielectric waveguide coupling devices 1204, 1206, and/or 1208 shown in FIG. 12 above. System 1400 comprises a dielectric waveguide 1404 that has a wave 1406 propagating as a guided wave about a waveguide surface of the dielectric waveguide 1404. In an embodiment, the dielectric waveguide 1404 is curved, and an end of the dielectric waveguide 1404 can be tied, fastened, or otherwise mechanically coupled to a wire 1402. When the end of the dielectric waveguide 1404 is fastened to the wire 1402, the end of the dielectric waveguide 1404 is parallel or substantially parallel to the wire 1402. Alternatively, another portion of the dielectric waveguide beyond an end can be fastened or coupled to wire 1402 such that the fastened or coupled portion is parallel or substantially parallel to the wire 1402. The coupling device 1410 can be a nylon cable tie or other type of non-conducting/dielectric material. The dielectric waveguide 1404 can be adjacent to the wire 1402 without surrounding the wire 1402.

When the dielectric waveguide 1404 is placed with the end parallel to the wire 1402, the guided wave 1406 travelling along the dielectric waveguide 1404 couples to the wire 1402, and propagates as guided wave 1408 about the wire surface of the wire 1402. In an example embodiment, the guided wave 1408 can be characterized as a surface wave or other electromagnetic wave.

It is noted that the graphical representations of waves 1406 and 1408 are presented merely to illustrate the principles that wave 1406 induces or otherwise launches a guided wave 1408 on a wire 1402 that operates, for example, as a single wire transmission line. The actual electric and magnetic fields generated as a result of such wave propagation may vary depending on one or more of the shape and/or design of the dielectric waveguide, the relative position of the dielectric waveguide to the wire, the frequencies employed, the design of the dielectric waveguide 1404, the dimensions and composition of the wire 1402, as well as its surface characteristics, its optional insulation, the electromagnetic properties of the surrounding environment, etc.

In an embodiment, an end of dielectric waveguide 1404 can taper towards the wire 1402 in order to increase coupling efficiencies. Indeed, the tapering of the end of the dielectric waveguide 1404 can provide impedance matching to the wire 1402, according to an example embodiment of the subject disclosure. For example, an end of the dielectric waveguide 1404 can be gradually tapered in order to obtain a desired level of coupling between waves 1406 and 1408 as illustrated in FIG. 14.

In an embodiment, the coupling device 1410 can be placed such that there is a short length of the dielectric waveguide 1404 between the coupling device 1410 and an end of the dielectric waveguide 1404. Increased coupling efficiencies are realized when the length of the end of the dielectric waveguide 1404 that is beyond the coupling device 1410 is one or more wavelengths long for whatever frequency is being transmitted.

In an embodiment, the dielectric waveguide 1404 can be composed of nylon, TEFLON polytetrafluoroethylene (PTFE), polyethylene, a polyamide, or other plastics. In other embodiments, other dielectric materials are possible. The wire surface of wire 1402 can be metallic with either a bare metallic surface, or can be insulated using plastic, dielectric, insulator or other sheathing. In an embodiment, a dielectric or otherwise non-conducting/insulated waveguide can be paired with either a bare/metallic wire or insulated wire. In other embodiments, a metallic and/or conductive waveguide can be paired with a bare/metallic wire or insulated wire. In an embodiment, an oxidation layer on the bare metallic surface of the wire 1402 (e.g., resulting from exposure of the bare metallic surface to oxygen/air) can also provide insulating or dielectric properties similar to those provided by some insulators or sheathings.

Figure 15:
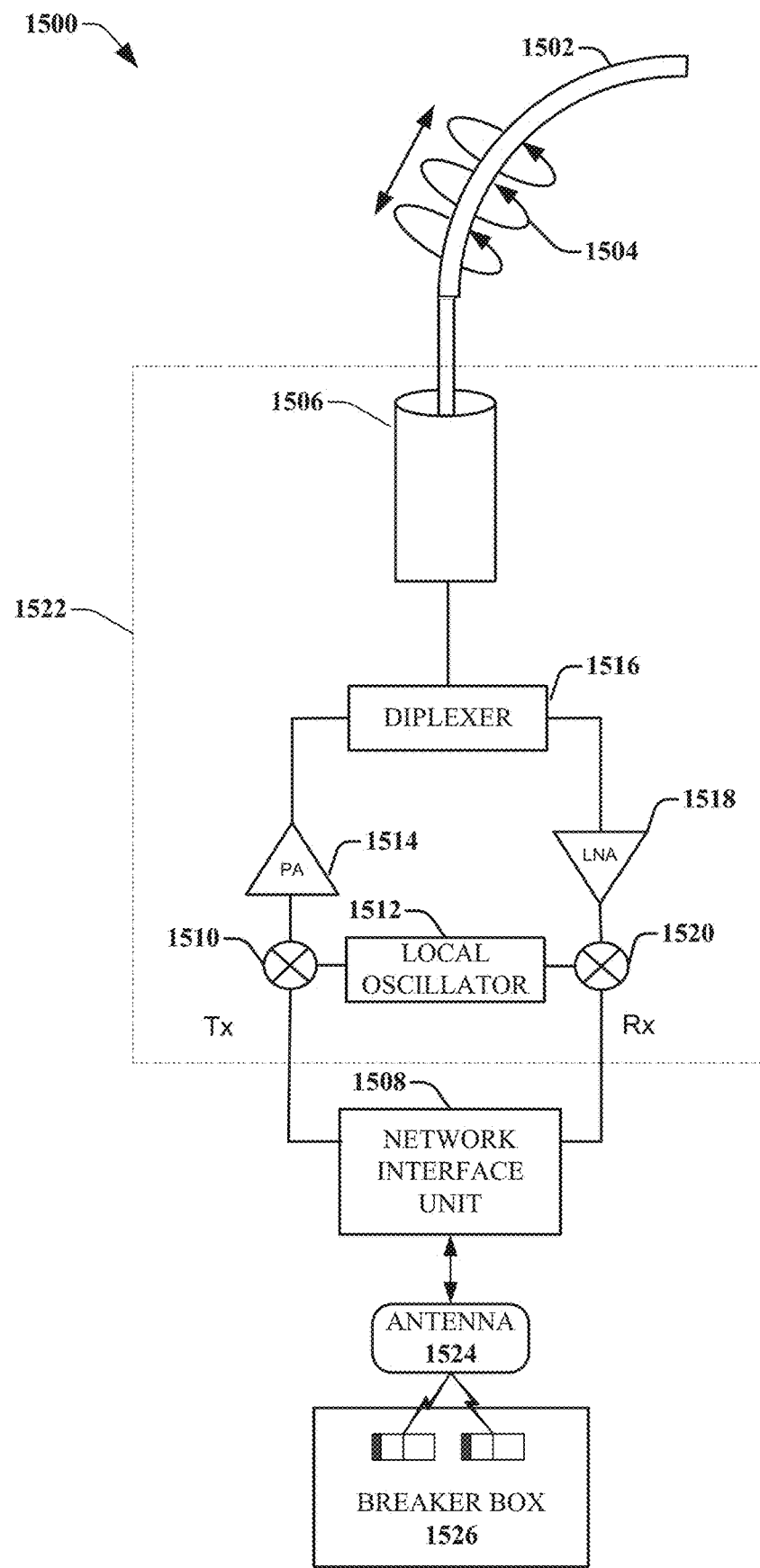
FIG. 15 is a block diagram illustrating an example, non-limiting embodiment of a dielectric waveguide coupler and transceiver in accordance with various aspects described herein.

Turning now to FIG. 15, illustrated is a block diagram of an example, non-limiting embodiment of a dielectric waveguide coupler and transceiver system 1500 in accordance with various aspects described herein. System 1500 comprises a transmitter/receiver device 1506 that launches and receives waves (e.g., guided wave 1504 onto dielectric waveguide 1502) based on signals received from and sent to network interface unit 1508 (e.g., network interface units 104, 204, 304, 402 shown in FIGS. 1-4 respectively).

Network interface unit 1508 can be connected to the breakers in breaker box 1526 that forms a circuit panel network system via antenna 1524. The network interface unit 1508 thus is a portal for communications entering and leaving the building that breaker box 1526 is associated with. Network interface unit 1508 is in turn communicably coupled to the dielectric waveguide coupling system 1522 (e.g., dielectric waveguide coupling devices 1208).

The output of the network interface unit 1508 can be combined with a millimeter-wave carrier wave generated by a local oscillator 1512 at frequency mixer 1510. Frequency mixer 1510 can use heterodyning techniques or other frequency shifting techniques to frequency shift the signals from network interface unit 1508. For example, signals sent to and from the network interface unit 1508 can be modulated signals such as orthogonal frequency division multiplexed (OFDM) signals formatted in accordance with a Long-Term Evolution (LTE) wireless protocol or other wireless 3G, 4G or higher voice and data protocol, a ZIGBEE protocol, WIMAX protocol, UltraWideband or IEEE 802.11 wireless protocol or other wireless protocol. In an example embodiment, this frequency conversion can be done in the analog domain, and as a result, the frequency shifting can be done without regard to the type of communications protocol that network interface unit 1508 uses. According to embodiment, as new communications technologies are developed, the network interface unit 1508 can be upgraded or replaced and the frequency shifting and transmission apparatus can remain, simplifying upgrades. The carrier wave can then be sent to a power amplifier ("PA") 1514 and can be transmitted via the transmitter/receiver device 1506 via the diplexer 1516.

Signals received from the transmitter/receiver device 1506 that are directed towards the network interface unit 1508 can be separated from other signals via diplexer 1516. The transmission can then be sent to low noise amplifier ("LNA") 1518 for amplification. A frequency mixer 1520, with help from local oscillator 1512 can downshift the transmission (which is in the millimeter-wave band or around 38 GHz in some embodiments) to the native frequency. The network interface unit 1508 can then receive the transmission.

In an embodiment, transmitter/receiver device 1506 can be a cylindrical (which, for example, can be hollow in an embodiment) metal or conducting waveguide and an end of the dielectric waveguide 1502 can be placed in or in proximity to the transmitter/receiver device 1506 such that when the transmitter/receiver device 1506 generates a transmission, the guided wave couples to dielectric waveguide 1502 and propagates as a guided wave 1504 about the waveguide surface of the dielectric waveguide 1502. Similarly, if guided wave 1504 is incoming (coupled to the dielectric waveguide 1502 from a wire), guided wave 1504 then enters the transmitter/receiver device 1506 and become coupled to the cylindrical waveguide or conducting waveguide.

In an embodiment, dielectric waveguide 1502 can be wholly constructed of a dielectric material, without any metallic or otherwise conducting materials therein. Dielectric waveguide 1502 can be composed of nylon, TEFLON polytetrafluoroethylene (PTFE), polyethylene, a polyamide, other plastics, or other materials that are non-conducting and suitable for facilitating transmission of electromagnetic waves on an outer surface of such materials. In another embodiment, dielectric waveguide 1502 can include a core that is conducting/metallic, and have an exterior dielectric surface. Similarly, a transmission medium that couples to the dielectric waveguide 1502 for propagating electromagnetic waves induced by the dielectric waveguide 1502 or for supplying electromagnetic waves to the dielectric waveguide 1502 can be wholly constructed of a dielectric material, without any metallic or otherwise conducting materials therein.

It is noted that although FIG. 15 shows that the opening of transmitter receiver device 1506 is much wider than the dielectric waveguide 1502, this is not to scale, and that in other embodiments the width of the dielectric waveguide 1502 is comparable or slightly smaller than the opening of the hollow waveguide. It is also not shown, but in an embodiment, an end of the waveguide 1502 that is inserted into the transmitter/receiver device 1506 tapers down in order to reduce reflection and increase coupling efficiencies.

Figure 16A:
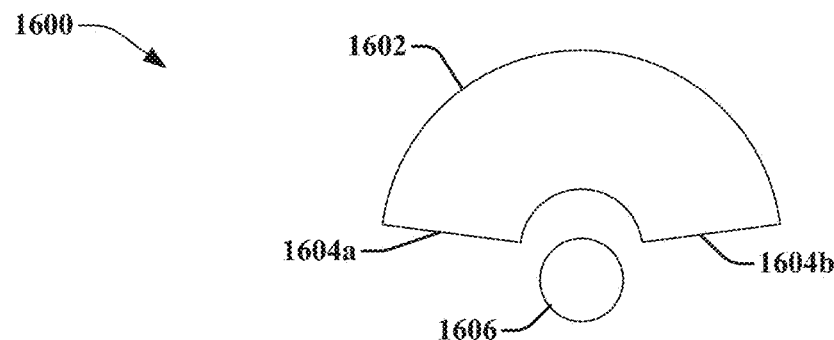
FIGS. 16a, 16b, and 16c are block diagrams illustrating example, non-limiting embodiments of a slotted waveguide coupler in accordance with various aspects described herein.
Figure 16B:
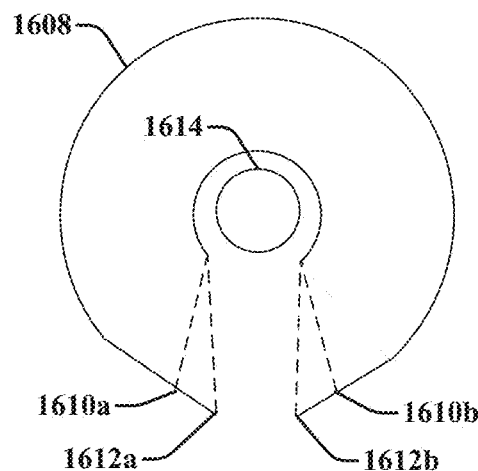
Figure 16C:
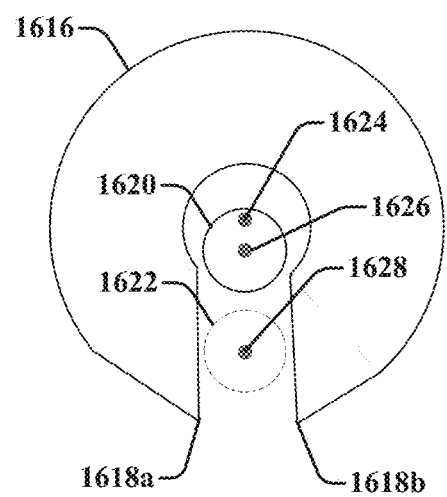

Before coupling to the dielectric waveguide 1502, the one or more waveguide modes of the guided wave generated by the transmitter/receiver device 1506 can couple to one or more wave propagation modes of the guided wave 1504. The wave propagation modes can be different than the hollow metal waveguide modes due to the different characteristics of the hollow metal waveguide and the dielectric waveguide. For instance, wave propagation modes can comprise the fundamental transverse electromagnetic mode (Quasi-TEM$_{00}$), where only small electrical and/or magnetic fields extend in the direction of propagation, and the electric and magnetic fields extend radially outwards from the dielectric waveguide 1502 while the guided waves propagate along the dielectric waveguide 1502. The fundamental transverse electromagnetic mode wave propagation mode does not exist inside a waveguide that is hollow. Therefore, the hollow metal waveguide modes that are used by transmitter/receiver device 1506 are waveguide modes that can couple effectively and efficiently to wave propagation modes of dielectric waveguide 1502. Turning now to FIGS. 16a, 16b, and 16c, illustrated are block diagrams of example, non-limiting embodiments of a slotted waveguide coupler system 1600 in accordance with various aspects described herein. In FIG. 16a, the waveguide coupler system comprises a wire 1606 that is positioned with respect to a waveguide 1602, such that the wire 1606 fits within or near a slot formed in the waveguide 1602 that runs longitudinally with respect to the wire 1606. The opposing ends 1604a and 1604b of the waveguide 1602, and the waveguide 1602 itself, surrounds less than 180 degrees of the wire surface of the wire 1606.

In FIG. 16b the waveguide coupler system comprises a wire 1614 that is positioned with respect to a waveguide 1608, such that the wire 1614 fits within or near a slot formed in the waveguide 1608 that runs longitudinally with respect to the wire 1614. The slot surfaces of the waveguide 1608 can be non parallel, and two different exemplary embodiments are shown in FIG. 16b. In the first, slot surfaces 1610a and 1610b can be non parallel and aim outwards, slightly wider than the width of the wire 1614. In the other embodiment, the slots surfaces 1612a and 1612b can still be non-parallel, but narrow to form a slot opening smaller than a width of the wire 1614. Any range of angles of the non parallel slot surfaces are possible, of which these are two exemplary embodiments.

In FIG. 16c, the waveguide coupler system shows a wire 1620 that fits within a slot formed in waveguide 1616. The slot surfaces 1618a and 1618b in this exemplary embodiment can be parallel, but the axis 1626 of the wire 1620 is not aligned with the axis 1624 of the waveguide 1616. The waveguide 1616 and the wire 1620 are therefore not coaxially aligned. In another embodiment, shown, a possible position of the wire at 1622 also has an axis 1628 that is not aligned with the axis 1624 of the waveguide 1616.

It is to be appreciated that while three different embodiments showing a) waveguide surfaces that surround less than 180 degrees of the wire, b) non parallel slot surfaces, and c) coaxially unaligned wires and waveguide were shown separately in FIGS. 16a, 16b, and 16c, in various embodiments, diverse combinations of the listed features are possible.

Figure 17:
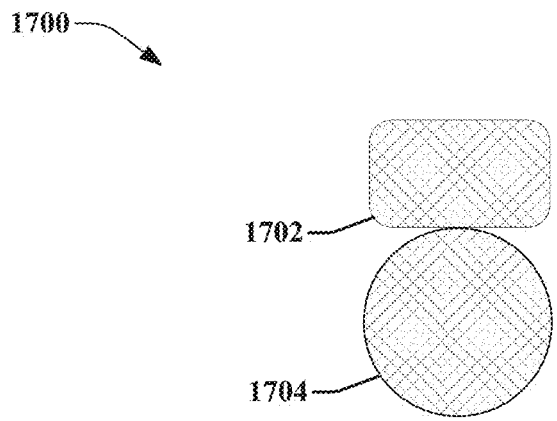
FIG. 17 is a block diagram illustrating an example, non-limiting embodiment of a waveguide coupling system in accordance with various aspects described herein.

Turning now to FIG. 17, illustrated is an example, non-limiting embodiment of a waveguide coupling system 1700 in accordance with various aspects described herein. FIG. 17 depicts a cross sectional representation of the waveguide and wire embodiments shown in FIGS. 12, 13, 14, and etc. As can be seen in 1700, the wire 1704 can be positioned directly next to and touching waveguide 1702. In other embodiments, as shown in waveguide coupling system 1800 in FIG. 18, the wire 1804 can still be placed near, but not actually touching waveguide strip 1802. In both cases, electromagnetic waves traveling along the waveguides can induce other electromagnetic waves on to the wires and vice versa. Also, in both embodiments, the wires 1704 and 1804 are placed outside the cross-sectional area defined by the outer surfaces of waveguides 1702 and 1802.

For the purposes of this disclosure, a waveguide does not surround, in substantial part, a wire surface of a wire when the waveguide does not surround an axial region of the surface, when viewed in cross-section, of more than 180 degrees. For avoidance of doubt, a waveguide does not surround, in substantial part a surface of a wire when the waveguide surrounds an axial region of the surface, when viewed in cross-section, of 180 degrees or less.

Figure 18:
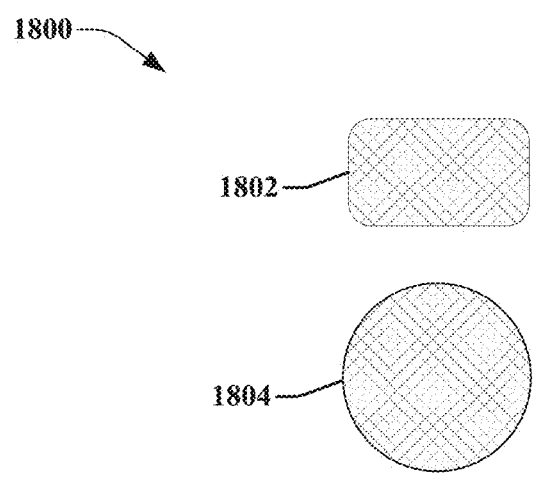
FIG. 18 is a block diagram illustrating an example, non-limiting embodiment of a waveguide coupling system in accordance with various aspects described herein.

It is to be appreciated that while FIGS. 17 and 18 show wires 1704 and 1804 having a circular shape and waveguides 1702 and 1802 having rectangular shapes, this is not meant to be limiting. In other embodiments, wires and waveguides can have a variety of shapes, sizes, and configurations. The shapes can include, but not be limited to: ovals or other elliptoid shapes, octagons, quadrilaterals or other polygons with either sharp or rounded edges, or other shapes. Additionally, in some embodiments, the wires 1704 and 1804 can be stranded wires comprising smaller gauge wires, such as a helical strand, braid or other coupling of individual strands into a single wire. Any of wires and waveguides shown in the figures and described throughout this disclosure can include one or more of these embodiments.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving wirelessly a first transmission of data from a network interface device communicatively coupled to at least one of a set of breakers of a circuit panel, wherein the set of breakers are coupled to a plurality of electrical circuits, wherein the at least one of the set of breakers includes at least one circuit breaker device configured for power line communication, wherein the network interface device is communicatively coupled to a transceiver that is coupled to a dielectric waveguide, wherein the dielectric waveguide is wholly constructed of a dielectric material and receives electromagnetic waves from a utility power line, wherein the electromagnetic waves convey the data, wherein the transceiver receives the electromagnetic waves propagating on a surface of the dielectric waveguide and converts the electromagnetic waves to an electric signal that conveys the data, wherein the network interface device receives the electric signal and wirelessly transmits the first transmission of the data according to the electrical signal, and wherein the receiving the first transmission of the data comprises receiving the first transmission wirelessly from a near field transducer located at the network interface device;
determining that the data is to be directed towards the at least one circuit breaker device or at least one of the plurality of electrical circuits associated with the at least one circuit breaker device based on mapping a header address of the data to a recipient device connected to the at least one of the plurality of electrical circuits, wherein the determining that the data is to be directed towards the at least one circuit breaker device or the at least one of the plurality of electrical circuits is based on mapping the header address of the data to a media access control address associated with the recipient device connected to the at least one of the plurality of electrical circuits; and
initiating, based upon the determining, a second transmission of the data as a power line communication transmission via the at least one circuit breaker device that is associated with the at least one of the plurality of electrical circuits.

2. The system of claim 1, wherein the receiving the first transmission comprises receiving the first transmission via a wireless receiver, and wherein the initiating the second transmission comprises initiating the second transmission via a power line communication chipset.

3. The system of claim 1, wherein the receiving the first transmission of the data comprises receiving the first transmission at the at least one circuit breaker device.

4. The system of claim 3, wherein the operations further comprise wirelessly transmitting, by the at least one circuit breaker device, a third transmission to the network interface device based on a signal received from a client device communicably coupled to the at least one of the plurality of electrical circuits.

5. The system of claim 4, wherein the wirelessly transmitting the third transmission comprises broadcasting the third transmission via a near field communication device.

6. The system of claim 1, wherein the dielectric waveguide comprises an end that is tapered and located near the utility power line for receiving the electromagnetic waves from a surface of the utility power line.

7. The system of claim 6, wherein the electromagnetic waves convey networking information.

8. The system of claim 1, wherein the first transmission is received by an antenna communicably coupled to the at least one circuit breaker device.

9. The system of claim 1, further comprising:
a power coupler configured to inductively receive power from a battery backup to provide power to one or more components of the system.

10. The system of claim 1, wherein the at least one circuit breaker device and another circuit breaker device form a subnet.

11. The system of claim 1, wherein a set of electrical outlets associated with the at least one of the plurality of electrical circuits comprises a section of a power line communication network where one packet is transmitted at a time.

12. A method, comprising:
receiving, by a processing system including a processor, wirelessly a first transmission of data from a network interface device communicatively coupled to at least one of a set of breakers of a circuit panel, wherein the set of breakers are coupled to a plurality of electrical circuits, wherein the at least one of the set of breakers includes at least one circuit breaker device configured for power line communication, wherein the network interface device is communicatively coupled to a transceiver that is coupled to a dielectric waveguide, wherein the dielectric waveguide is wholly constructed of a dielectric material and receives electromagnetic waves from a utility power line, wherein the electromagnetic waves convey the data, wherein the transceiver receives the electromagnetic waves propagating on a surface of the dielectric waveguide and converts the electromagnetic waves to an electric signal that conveys the data, wherein the network interface device receives the electric signal and wirelessly transmits the first transmission of the data according to the electrical signal, and wherein the receiving the first transmission of the data comprises receiving the first transmission wirelessly from a near field transducer located at the network interface device;
determining, by the processing system that the data is to be directed towards the at least one circuit breaker device or at least one of the plurality of electrical circuits associated with the at least one circuit breaker device based on mapping a header address of the data to a recipient device connected to the at least one of the plurality of electrical circuits, wherein the determining that the data is to be directed towards the at least one circuit breaker device or the at least one of the plurality of electrical circuits is based on mapping the header address of the data to a media access control address associated with the recipient device connected to the at least one of the plurality of electrical circuits; and
initiating, by the processing system, based upon the determining, a second transmission of the data as a power line communication transmission via the at least one circuit breaker device that is associated with the at least one of the plurality of electrical circuits.

13. The method of claim 12, wherein the receiving, by the processing system, the first transmission further comprises receiving, by the processing system, the first transmission via a wireless receiver, and wherein the initiating, by the processing system, the second transmission further comprises initiating, by the processing system, the second transmission via a power line communication chipset.

14. The method of claim 12, wherein the receiving the first transmission of the data further comprises receiving, by the processing system, the first transmission at the at least one circuit breaker device.

15. The method of claim 14, further comprising wirelessly transmitting, by the at least one circuit breaker device, a third transmission to the network interface device based on a signal received from a client device communicably coupled to the at least one of the plurality of electrical circuits.

16. The method of claim 12, wherein the at least one circuit breaker device and another circuit breaker device form a subnet.

17. A non-transitory, machine-readable medium, comprising executable instructions that, when executed by a processing system including a processor, facilitate performance of operations, the operations comprising:
receiving wirelessly a first transmission of data from a network interface device communicatively coupled to at least one of a set of breakers of a circuit panel, wherein the set of breakers are coupled to a plurality of electrical circuits, wherein the at least one of the set of breakers includes at least one circuit breaker device configured for power line communication, wherein the network interface device is communicatively coupled to a transceiver that is coupled to a dielectric waveguide, wherein the dielectric waveguide is wholly constructed of a dielectric material and receives electromagnetic waves from a utility power line, wherein the electromagnetic waves convey the data, wherein the transceiver receives the electromagnetic waves propagating on a surface of the dielectric waveguide and converts the electromagnetic waves to an electric signal that conveys the data, wherein the network interface device receives the electric signal and wirelessly transmits the first transmission of the data according to the electrical signal, and wherein the receiving the first transmission of the data comprises receiving the first transmission wirelessly from a near field transducer located at the network interface device;
determining that the data is to be directed towards the at least one circuit breaker device or at least one of the plurality of electrical circuits associated with the at least one circuit breaker device based on mapping a header address of the data to a recipient device connected to the at least one of the plurality of electrical circuits, wherein the determining that the data is to be directed towards the at least one circuit breaker device or the at least one of the plurality of electrical circuits is based on mapping the header address of the data to a media access control address associated with the recipient device connected to the at least one of the plurality of electrical circuits; and
initiating, based upon the determining, a second transmission of the data as a power line communication transmission via the at least one circuit breaker device that is associated with the at least one of the plurality of electrical circuits.

18. The non-transitory, machine-readable medium of claim 17, wherein the receiving the first transmission comprises receiving the first transmission via a wireless receiver, and wherein the initiating the second transmission comprises initiating the second transmission via a power line communication chipset.

19. The non-transitory, machine-readable medium of claim 17, wherein the receiving the first transmission of the data comprises receiving the first transmission at the at least one circuit breaker device.

20. The non-transitory, machine-readable medium of claim 19, wherein the operations further comprise wirelessly transmitting, by the at least one circuit breaker device, a third transmission to the network interface device based on a signal received from a client device communicably coupled to the at least one of the plurality of electrical circuits.

* * * * *